(12) United States Patent
Fujimura et al.

(10) Patent No.: US 7,308,112 B2
(45) Date of Patent: Dec. 11, 2007

(54) SIGN BASED HUMAN-MACHINE INTERACTION

(75) Inventors: Kikuo Fujimura, Palo Alto, CA (US); Xia Liu, Columbus, OH (US)

(73) Assignees: Honda Motor Co., Ltd., Tokyo (JP); The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 11/129,164

(22) Filed: May 12, 2005

(65) Prior Publication Data
US 2005/0271279 A1 Dec. 8, 2005

Related U.S. Application Data

(60) Provisional application No. 60/571,319, filed on May 14, 2004, provisional application No. 60/635,146, filed on Dec. 10, 2004.

(51) Int. Cl.
*G06K 9/00* (2006.01)
(52) U.S. Cl. .................. 382/103; 382/107; 382/181; 382/259
(58) Field of Classification Search ............ 382/103, 382/107, 181, 259
See application file for complete search history.

(56) References Cited

U.S. PATENT DOCUMENTS

| 5,454,043 | A | 9/1995 | Freeman |
| 5,581,276 | A | 12/1996 | Cipolla et al. |
| 5,594,469 | A | 1/1997 | Freeman et al. |
| 6,002,808 | A | 12/1999 | Freeman |
| 6,128,003 | A | 10/2000 | Smith et al. |
| 6,215,890 | B1 * | 4/2001 | Matsuo et al. .............. 382/103 |
| 6,720,949 | B1 | 4/2004 | Pryor et al. |
| 6,788,809 | B1 | 9/2004 | Grzeszczuk et al. |
| 6,819,782 | B1 * | 11/2004 | Imagawa et al. ........... 382/115 |
| 2002/0041327 | A1 * | 4/2002 | Hildreth et al. .............. 348/42 |

(Continued)

FOREIGN PATENT DOCUMENTS

| WO | WO 00/30023 A1 | 5/2000 |
| WO | WO 2004/097612 A2 | 11/2004 |

OTHER PUBLICATIONS

Gvili et al.; "Depth Keying", SPIE Elec. Imaging, 2003.*

(Continued)

*Primary Examiner*—Bhavesh M Mehta
*Assistant Examiner*—John B Strege
(74) *Attorney, Agent, or Firm*—Fenwick & West LLP; Mark E. Duell

(57) ABSTRACT

Communication is an important issue in man-to-robot interaction. Signs can be used to interact with machines by providing user instructions or commands. Embodiment of the present invention include human detection, human body parts detection, hand shape analysis, trajectory analysis, orientation determination, gesture matching, and the like. Many types of shapes and gestures are recognized in a non-intrusive manner based on computer vision. A number of applications become feasible by this sign-understanding technology, including remote control of home devices, mouse-less (and touch-less) operation of computer consoles, gaming, and man-robot communication to give instructions among others. Active sensing hardware is used to capture a stream of depth images at a video rate, which is consequently analyzed for information extraction.

23 Claims, 14 Drawing Sheets

U.S. PATENT DOCUMENTS

| | | | |
|---|---|---|---|
| 2002/0181773 A1* | 12/2002 | Higaki et al. | 382/190 |
| 2003/0113018 A1* | 6/2003 | Nefian et al. | 382/181 |
| 2003/0156756 A1 | 8/2003 | Gokturk et al. | |
| 2004/0151366 A1 | 8/2004 | Nefian et al. | |
| 2004/0189720 A1 | 9/2004 | Wilson et al. | |
| 2004/0193413 A1 | 9/2004 | Wilson et al. | |
| 2006/0033713 A1* | 2/2006 | Pryor | 345/158 |

OTHER PUBLICATIONS

Ishibuchi et al.; "Real Time Vision-Based Hand Gesture Estimatiohn for a Human-Computer Interface", Systems and Computers In Japan, vol. 28, No. 7, 1997.*

Redert et al.; "ATTEST: Advanced Three-dimensional Television System technologies", 3DPVT, 2002.*

Zhu et al.; "3D Head Pose Estimation with Optica Flow and Depth Constraints", Proceedings of the Fourth International Conference on 3D Digital Imaging and Modeling, 2003.*

Athitsos, V. et al., "An Appearance-Based Framework for 3D Hand Shape Classification and Camera Viewpoint Estimation," Proceedings of the Fifth IEEE International Conference on Automatic Face and Gesture Recognition (FGR'02), IEEE, 2002, 8 pages.

Bretzner, L. et al., "Hand Gesture Recognition using Multi-Scale Colour Features, Hierarchical Models and Particle Filtering," Proceedings of the Fifth IEEE International Conference on Automatic Face and Gesture Recognition (FGR'02), IEEE, 2002, 8 pages.

Gavrila, D.M. et al., "Real-Time Object Detection for "Smart" Vehicles," The Proceedings of the Seventh IEEE International Conference on Computer Vision, Sep. 20-27, 1999, 10 pages.

Iddan, G.J. et al., "3D Imaging in the Studio (and Elsewhere . . . )" Proceedings of the SPIE, Jan. 24-25, 2001, pp. 48-55, vol. 4298.

Jojic, N. et al., "Detection and Estimation of Pointing Gestures in Dense Disparity Maps," Fourth IEEE International Conference on Automatic Face and Gesture Recognition, Mar. 28-30, 2000, 15 pages.

Malassiotis, S. et al., "A Gesture Recognition System using 3D Data," Proceedings of the First International Symposium on 3D Data Processing Visualization and Transmission (3DPVT'02), IEEE, 2002, pp. 1-4.

Oka, K. et al., "Real-Time Tracking of Multiple Fingertips and Gesture Recognition for Augmented Desk Interface System," Proceedings of the Fifth IEEE International Conference on Automatic Face and Gesture Recognition (FGR'02), IEEE, 2002, 12 pages.

Pavlovic, V.I. et al., "Visual Interpretation of Hand Gestures for Human-Computer Interaction: A Review," IEEE Transactions on Pattern Analysis and Machine Intelligence, Jul. 1997, vol. 17, No. 7.

Polat, E. et al., "Robust Tracking of Human Body Parts for Collaborative Human Computer Interaction," Computer Vision and Image Understanding, 2003, pp. 44-69, vol. 89.

Sakagami, Y. et al., "The Intelligent ASIMO: System Overview and Integration," Proceedings of the 2002 IEEE/RSJ, Intl. Conference on Intelligent Robots and Systems, IEEE, 2002, pp. 2478-2483.

Starner, T. et al., "Real-Time American Sign Language Recognition Using Desk and Wearable Computer Based Video," IEEE Transactions on Pattern Analysis and Machine Intelligence, Dec. 1996, pp. 1371-1375, vol. 20, No. 12.

Vogler, C. et al., "ASL Recognition Based on a Coupling Between HMMs and 3D Motion Analysis," Sixth International Conference on Computer Vision, Jan. 4-7, 1998, pp. 363-369.

Wilson, A.D. et al., "Parametric Hidden Markov Models for Gesture Recognition," IEEE Transactions on Pattern Analysis and Machine Intelligence, Sep. 1999, pp. 884-900, vol. 21, No. 9.

Zhu, X. et al., "Segmenting Hands of Arbitrary Color," Proceedings of the Fourth IEEE International Conference on Automatic Face and Gesture Recognition, Mar. 28-30, 2000, pp. 446-453.

Zhu, Y. et al., "A Real-Time Approach to the Spotting, Representation, and Recognition of Hand Gestures for Human-Computer Interaction," Computer Vision and Image Understanding, 2002, pp. 189-208, vol. 85.

Lee et al., "Online, Interactive Learning of Gestures for Human/Robot Interfaces," Proceedings of the 1996 IEEE International Conference on Robotics and Automation, Apr. 1996, pp. 2982-2987.

* cited by examiner

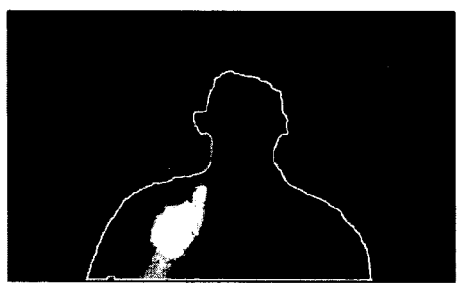
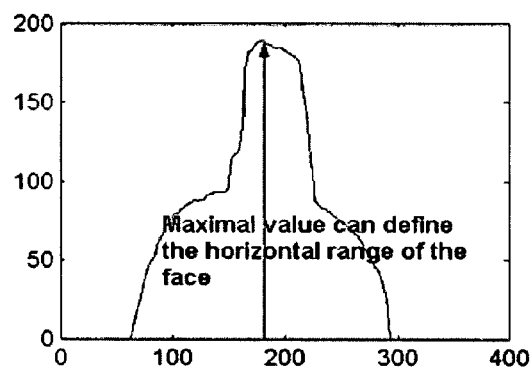
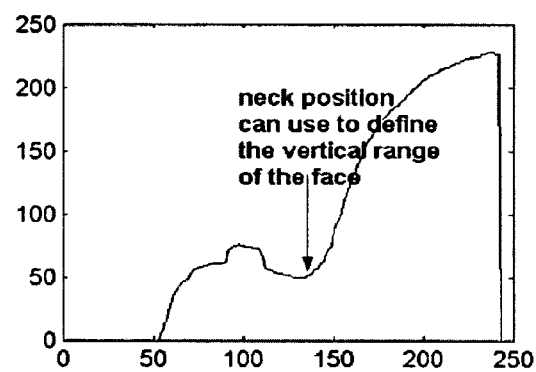
FIG. 6

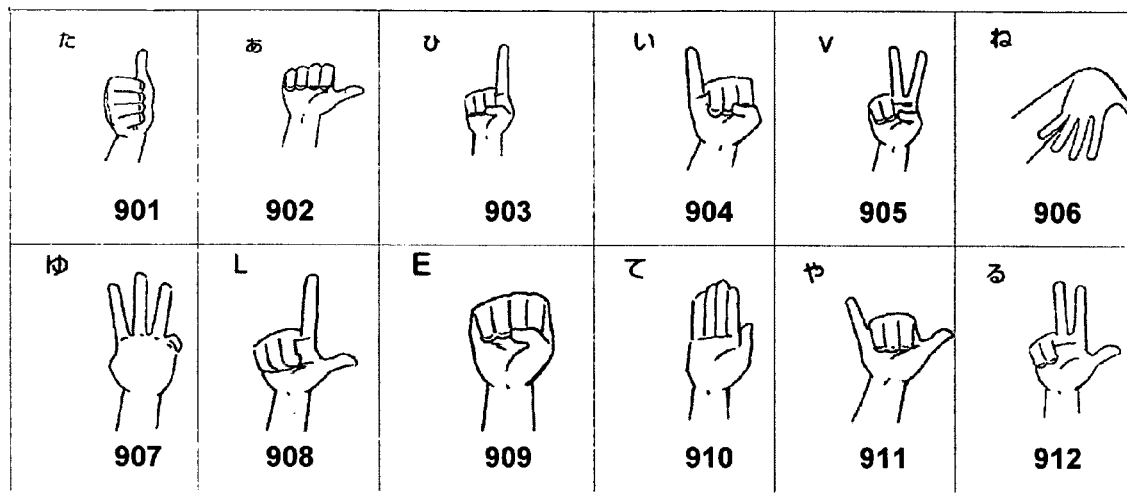
FIG. 9
 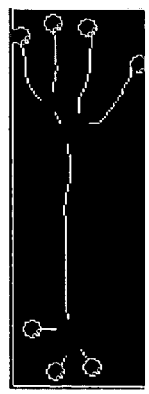 
FIG. 11A  FIG. 11B  FIG. 11C

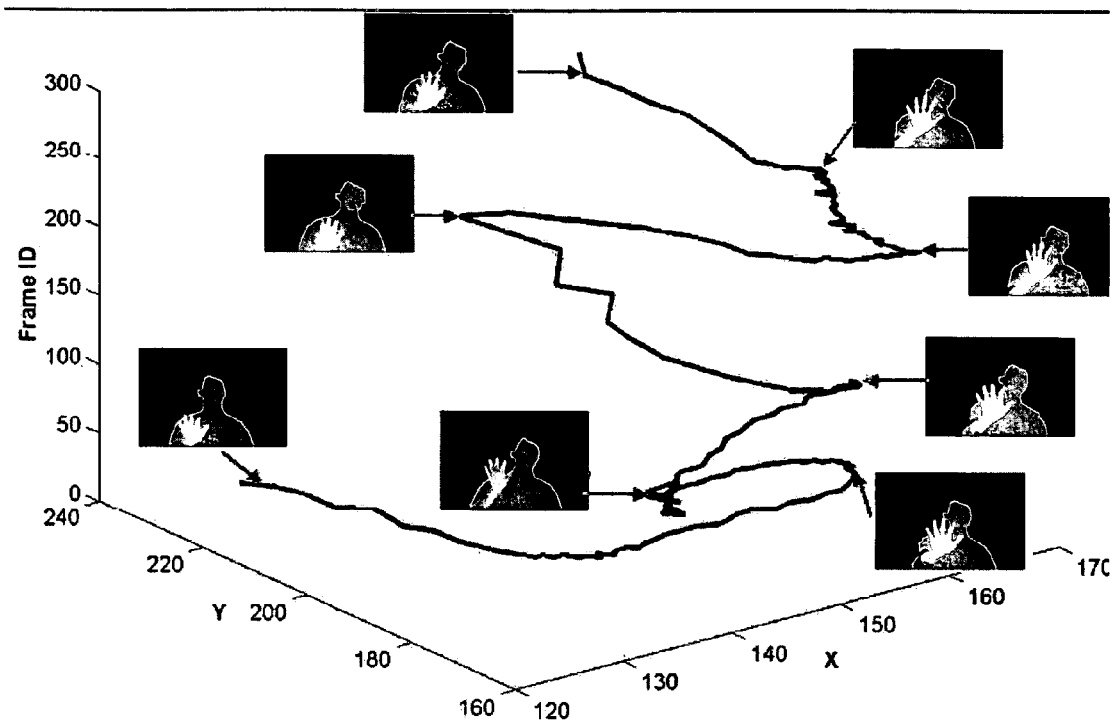
FIG. 12
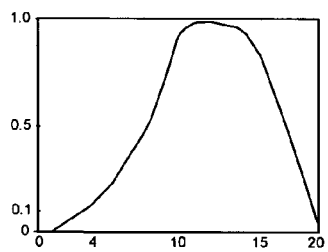
1301a
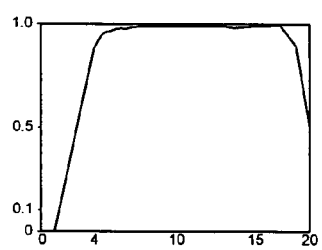
1301b
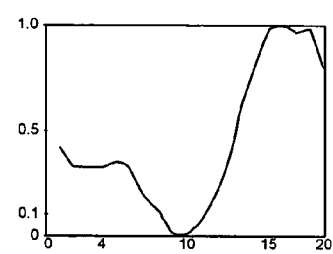
1301c
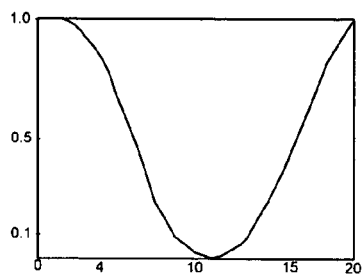
1301d
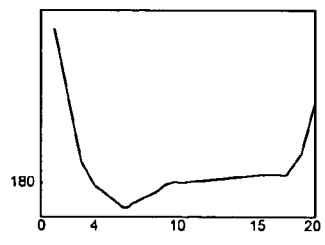
1301e
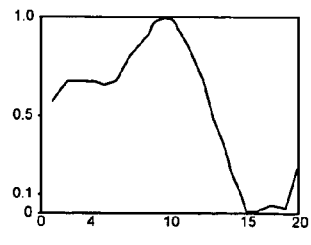
1301f
FIG. 13

SIGN BASED HUMAN-MACHINE INTERACTION

RELATED APPLICATIONS

This application claims priority to U.S. Provisional Patent Application Ser. No. 60/571,319 titled "Hand Gesture Recognition Using Depth Data" and filed on May 14, 2004 by Liu et al., which is incorporated herein by reference and also claims priority to U.S. Provisional Patent Application Ser. No. 60/635,146 titled "Sign Based Man-Machine Interaction" and filed on Dec. 10, 2004 by Fujimura et al., which is incorporated herein by reference.

FIELD OF THE INVENTION

The present invention relates generally to human-machine interaction and more particularly to human-computer interaction ("HCI") based on computer vision recognition of human signs and gestures.

BACKGROUND OF THE INVENTION

With the advent of super-fast computing systems and highly efficient digital imaging systems, the field of computer vision based man-machine interaction has undergone a period of significant technological advancements. From simple motion detection systems where motion triggers a response from a machine (e.g., surveillance systems) to highly complex three-dimensional ("3D") imaging sign recognition systems have been the subject of significant development in the last few years. For example, in the area of sign based human-machine communications, the recognition of human sign language has been a subject of much study lately as a promising technology for man-machine communications. Other sign recognition systems and even more complex gesture recognition systems have been developed based on various methods to locate and track hands and their motion with respect to other body parts (e.g., arms, torso, head, and the like).

These conventional techniques for sign and gesture recognition generally require markers, specific colors, backgrounds or gloves to aid the machine vision system in finding the source of the sign or gesture. For example, some conventional approaches for hand detection use color or motion information to determine the image region that corresponds to the hand or hands gesturing to the system. In these approaches, tracking hand motion is highly unreliable under varying lighting conditions. Some systems use special equipment such as gloves, while some others use a background with specific color to make the task feasible.

In these conventional systems, even when the hand location can be determined and tracked across image frames, analyzing the shape of the hand to determine the sign being provided is still a very difficult task. The shape recognition task becomes even more difficult when attempting to analyze the shape based on real time processing of the image data. To improve efficiency of the hand shape analysis process, a magnified view of the hand region can be used by focusing the image capturing device to the appropriate region in the scene. However, any body, arm, head, or other posture information might be missed by falling out of the imaging frame.

To capture whole body posture information in the image data some depth capable systems use multiple cameras as a means to determine depth information. Images captured from different angles provide sufficient data to extract 3D information of the subject. To understand the 3D volume obtained, 3D model fitting has also been proposed, yet it is a complex and computation-intensive process, frequently unstable and generally not fit for real-time applications. Stereo vision, which is a popular choice in depth capable systems, usually does not provide image resolution sufficient for hand shape analysis due to lack of texture on the subject. Thus, depth has primarily been used to detect a limited set of simple gestures such as large pointing motions. Some approaches use high-resolution 3D data obtained by using coded lighting for static hand posture analysis. However, these high-resolution systems require massive computational and storage resources generally unavailable or not capable of real-time performance.

Accordingly, what is needed is an approach to computer based gesture and sign recognition for human-computer interaction that (i) can analyze multiple features simultaneously including hand location, hand shape, movement, orientation, speed, and the like, (ii) can recognize gestures without using any special background, marks, or gloves; (iii) be based on computationally inexpensive computation module to achieve real-time gesture recognition; and (iv) that is less susceptible to illumination changes.

SUMMARY OF THE INVENTION

In accordance to the present invention, systems, methods, apparatuses, and computer readable media for human-machine interaction. In one embodiment, a system provides computer vision based recognition and interpretation of gestures and signs as commands and other communications for human-computer interaction.

According to one embodiment, a system and method for man-machine interaction operates based on depth and image information in digital images of a target. A digital image of a target is received. The digital image includes depth data associated with image pixels corresponding to the distance from the target (or other background) to the camera. A location of a hand of the target within the pixels of the image is determined based on the depth data associated with the pixels. A candidate shape of the hand of the target captured in the digital image is matched with a stored shape image from a set of shape images by comparing the stored shape images with the candidate shape.

According to another embodiment, a method and system for man-machine interaction relies on receiving digital images of the target. The digital image is pre-processed to determine a location of at least a hand and a head or a torso of the target. The shape of the hand is matched with a stored hand shape to provide a matched shape associated with the digital image. A candidate image data object is created which includes information associated with the location of a hand with respect to the head or the torso of the target. The candidate image data object also includes information indicating the matched shape associated with the digital image. A gesture captured by the digital images is matched with a stored gesture by comparing the candidate image data object with stored gesture profiles. The stored gesture profiles similarly include hand to body part location information and hand shape information for comparing with the candidate image data object.

According to yet another embodiment, a computer based system for man-machine interaction includes an image data pre-processing module, a shape matching module, and a gesture matching module. The image data pre-processing module is for receiving frames of image data comprising human image information. In addition, the image pre-processing module is configured to determine locations of one or more body parts of the human in the frames. This and other information is used by the shape matching module to match a shape of a body part by comparing information associated with the image data with stored shape profiles in a shape database. For this purpose, the shape matching module is coupled to the image data pre-processing module so it may receive the determined locations. Finally, the gesture matching module is also coupled to the image data-preprocessing module and the shape matching module so it may receive shape and location information. The gesture matching module is configured to match a gesture of the body part by comparing gesture attributes of the body part with gesture profiles stored in a gesture database. The gesture attributes include values associated with body part locations and shape information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 6 show a depth component frame and corresponding threshold image from which a projection method is applied to determine head position in a frontal facing view according to one embodiment.

FIG. 9 shows examples of Japanese Sign Language hand signs according to one embodiment.

FIG. 11A-C shows a set of images and corresponding processed image data illustrating a skeleton based hand shape matching technique according to one embodiment.

FIG. 12 shows one sample line chart of a three dimensional trajectory of a hand according to one embodiment.

FIG. 13 shows example template patterns for X, Y, and Z curves according to one embodiment.

DETAILED DESCRIPTION OF PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1A:
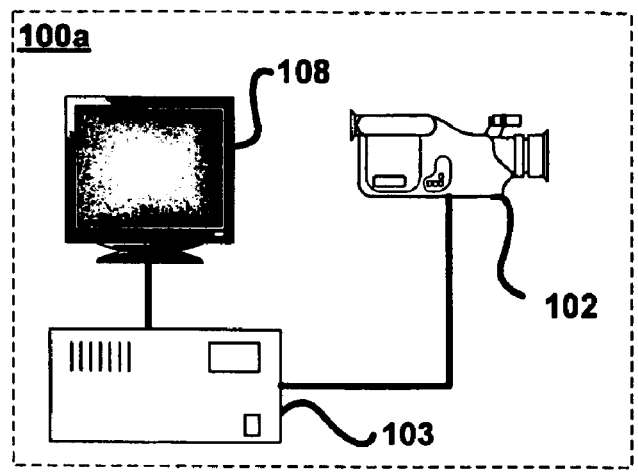
FIG. 1A shows one embodiment of a personal computing man-machine interaction system.

Referring now to FIG. 1A, one embodiment of a personal computing man-machine interaction system is shown. In this embodiment, the system 100a includes an imaging device 102, such as for example, one or more digital video cameras, digital still cameras, time-of-flight cameras, infrared cameras, or the like. The imaging device 102 is coupled to a personal computing device 103. The personal computing device 103 is coupled to a display 108.

The personal computing device 103 may be coupled to the imaging device 102 through wired or wireless connections. The personal computing device 103 includes conventional data processing and storage devices, such as computer processors and computer readable storage media, including RAM, ROM, flash memory, disk drives, and the like. The computer readable media is capable of storing computer program instructions that when implemented in a computer system performs steps to implement certain functions as further described below. Preferably, the computer processors are conventional multi-purpose processors capable of implementing image processing functions when executing program instructions derived from executable software programs. In one embodiment, the personal computing device 103 includes a computer readable media from which it accesses one or more computer programs that include gesture recognition features for providing instructions to the personal computer system 103 and effectuate related changes in the computer display 108. For example, a computer gaming application may enable the computer system 103 to receive user gesture-based commands to control the game as it is displayed on a screen 108. In another embodiment, a sign language recognition application enables a person to communicate with the personal computer 103 using a conventional sign language. In should be noted that the personal computing device 103 may include, without limitation, a desktop computer, a portable or laptop computer, a personal digital assistant ("PDA"), a cellular telephone, wearable computer systems, or the like. For example, in one embodiment, the personal computing device 103 includes an image-processing library, such as for example, Intel's image processing library, from Intel Corporation of Santa Clara, Calif., and runs at 14 frames per second (320×240 pixels) on a 1.2 GHz Pentium III processor by Intel Corporation.

Figure 1B:
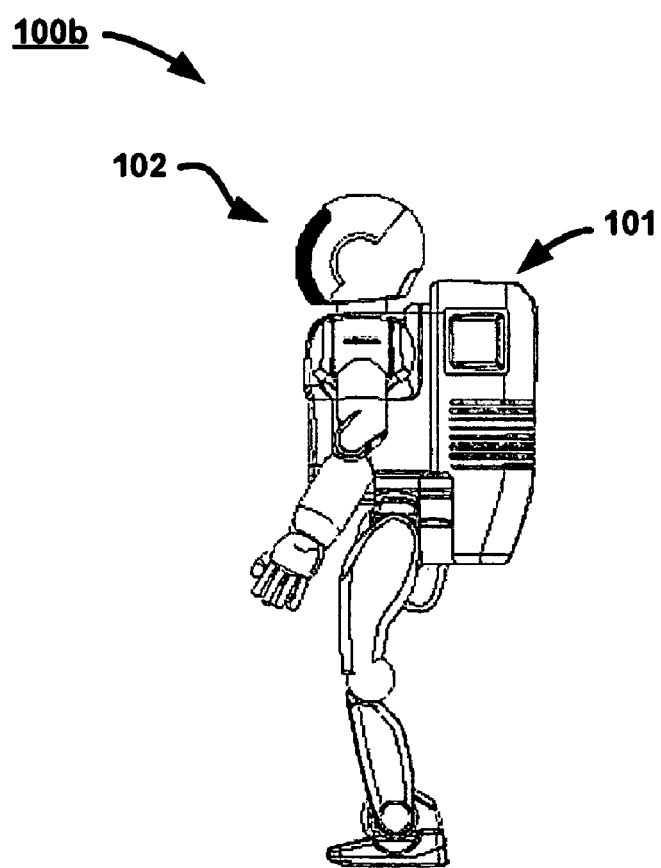
FIG. 1B shows one embodiment of a robotic man-machine interaction system.

Referring now to FIG. 1B, one embodiment of a robotic man-machine interaction system is shown. In one embodiment, a humanoid system 100b includes an imaging device 102, one or more data processing units and data storage devices in back-pack 101. One example of such a system is the ASIMO advanced humanoid robot, of Honda Motor Co., Ltd., Tokyo, Japan. In this embodiment, the imaging device 102 is configured to capture image data from which to identify humans and control gestures. In one embodiment, a depth-sensing camera is part of a robotic vision unit and the data processing unit includes a module within the robot's control logic. The processing unit implements techniques further described below to isolate the human gestures and recognize commands for operation.

As will be shown from this description, many other applications are possible to build a multitude of human-computer gesture-based interaction systems, e.g., vehicular applications for drivers or passengers to provide instructions to a vehicle, sign language translation systems, and the like. For example, in yet another embodiment, a depth-sensing camera is placed in a vehicle cabin connected to a computing module in a data processing control unit within the vehicle, for example, for controlling driver assistance features or other vehicular safety features. Thus, generally, a data processing system may include any processing system, ranging from a micro-chip controller, embedded processor, or the like, to a workstation, a personal computer type system, or even a networked distributed processing system.

Figure 2:
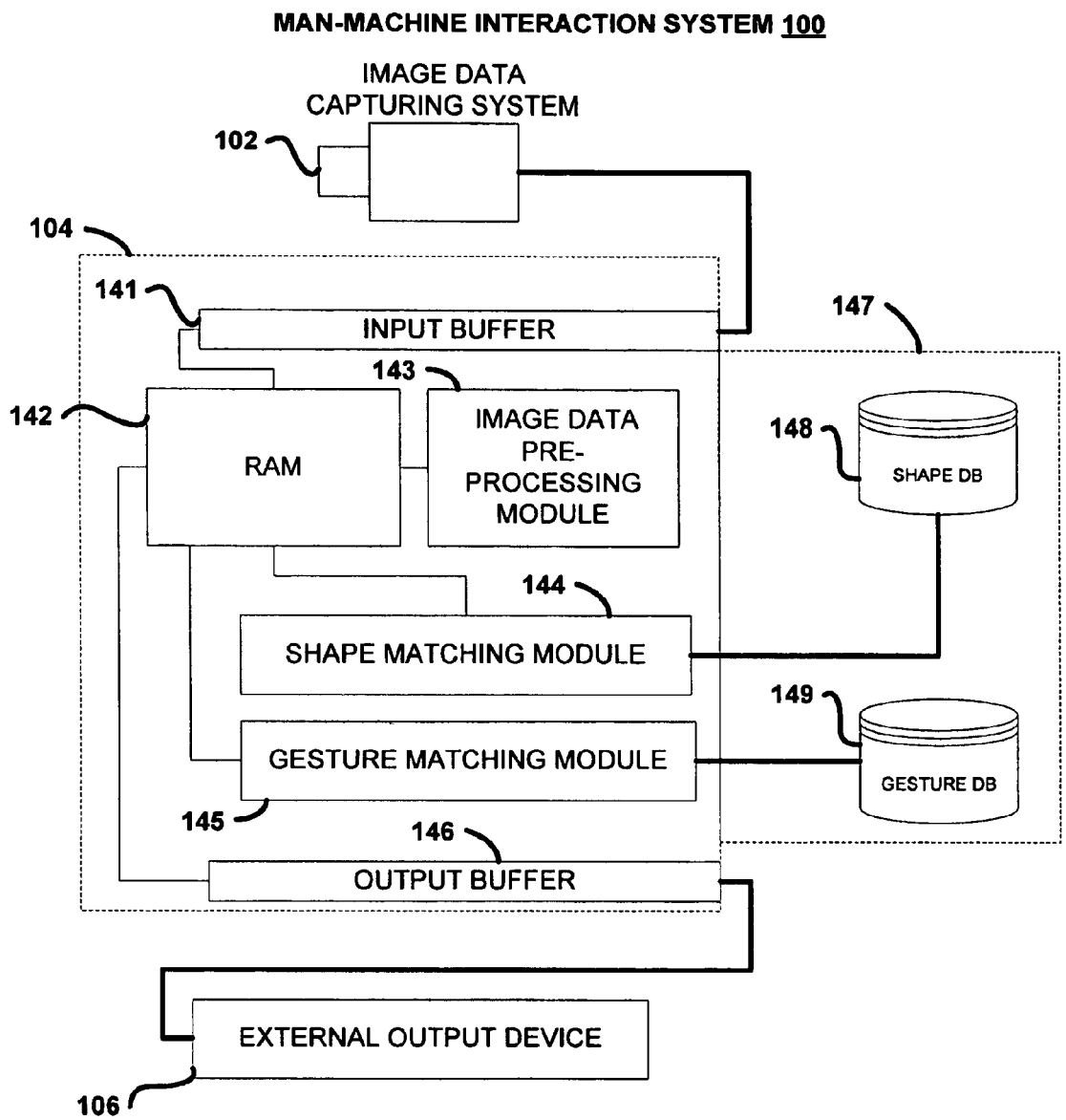
FIG. 2 shows a functional block diagram of one embodiment of a man-machine interaction system.

Referring now to FIG. 2, a functional block diagram of one embodiment of a man-machine interaction system is shown. In this embodiment, an image data capturing system 102 is coupled to a data processing system 104. The data processing system may preferably include data storage devices 147. However, the data storage devices 147 may be external or remote to the processing system 104. The processing system 104 is also coupled to an output device 106. In one embodiment, the output device 106 is an additional data processing module, either external to, or implemented within data processing system 104. For example, the output device 106 may be a graphical user interface, a display, a gesture-command translation module, or the like.

In one embodiment, image data capturing system 102 is based on depth-sensing technology. Depth-sensing technology is based on the time-of-flight principle. Cameras using this technology are known as time-of-flight cameras. In the present embodiment, the image capturing method of camera 102 is based on active sensing with a time-of-flight camera. Active depth sensing is performed with a pulse of infrared illumination. The pulse is projected to a target and the sensor reads its echo signal reflected from the target. Furthermore, the camera 102 has a high-speed shutter by which it controls the sensing scope for targets whose signal can enter the sensor. For a far object, the echo can reach the sensor in the camera 102 only after the shutter has been closed. Thus, no signal is recorded for the corresponding object (thus, most background objects disappear from the recorded scene). This feature of the depth-sensing camera 102 beneficially provides a range (e.g., Dmin-Dmax) of operation, referred to as depth window. In one embodiment, depth information is recorded only for objects (e.g., a human target) in this range of operation or depth window. Other objects beyond the depth window do not produce depth data, i.e., the reflected signal reaches the camera after the shutter has closed. Alternative embodiments use a cyclic depth value such that depth values for objects beyond the Dmax distance start from 0 depth. In this embodiment, pre-processing of the image data based on the repetition of depth values ensures that undesired background related data is eliminated. This range feature eliminates background clutter by setting Dmax immediately behind the target being imaged (i.e., the presence of objects beyond the Dmax depth is in effect eliminated).

Figure 4:
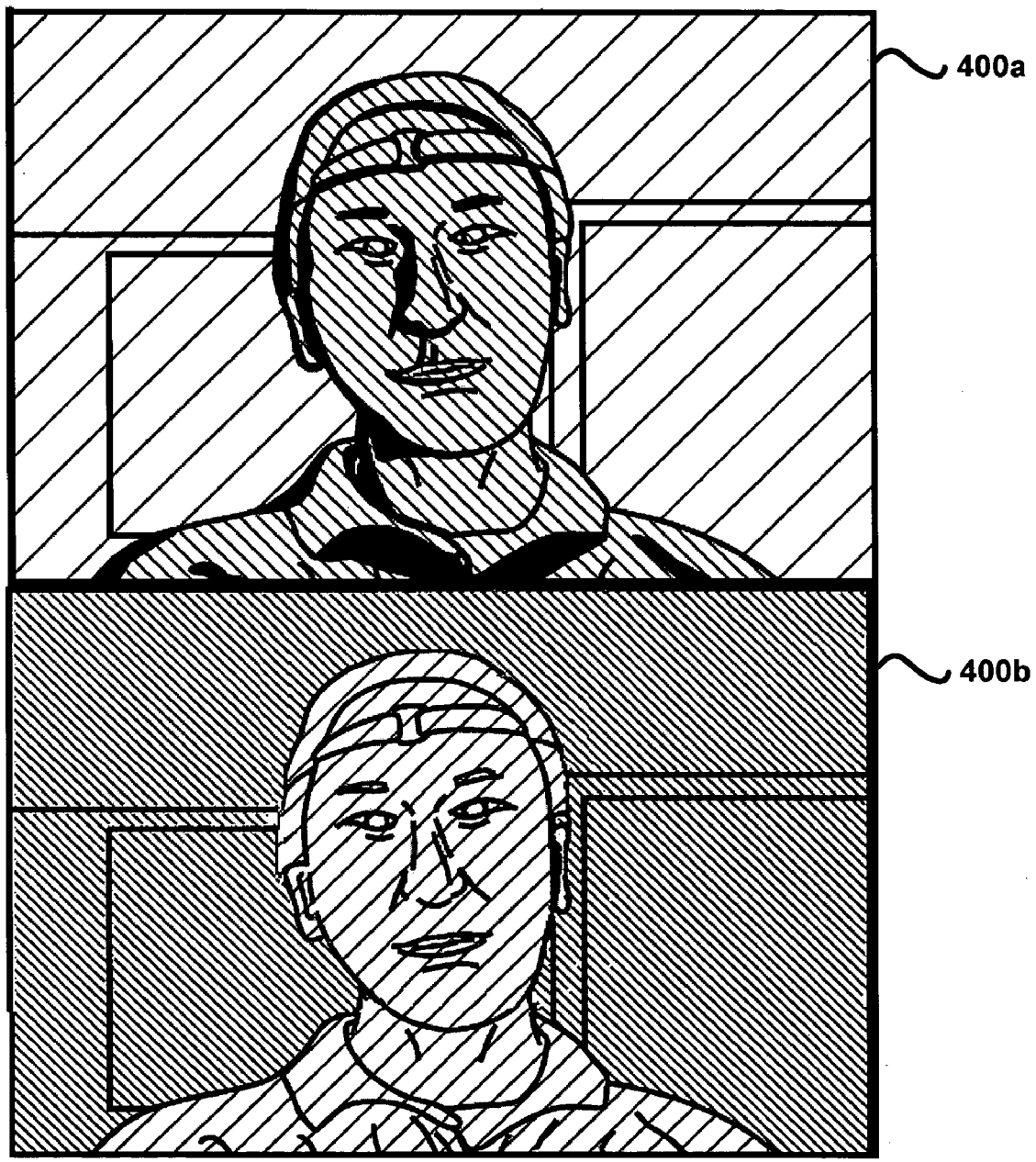
FIG. 4 shows a hybrid depth-color scene image according to one embodiment.

The depth camera 102 produces hybrid image data, generally referred to as depth image data. This hybrid depth-image data or depth video is produced by capturing depth and color/gray scale information simultaneously using the same optical axis in real-time. Although the image rate may vary, one embodiment of the system 100 operates with a stream of video at 14 frames per second. In the context of this discussion, color information is meant to include "black and white" (grayscale) data and what is generally referred to as color data (e.g., RGB/color). For example, referring now to FIG. 4, a hybrid depth-color scene image according to one embodiment is shown. The image 400 includes a color information sub-frame 400a and a depth information sub-frame 400b. The hybrid image 400 is similar to a conventional digital image, that is, "color" (or grayscale/black and white) and related information is provided for every pixel. The depth information part (shown as sub-frame 400b) of the hybrid image 400 includes depth values for every pixel. To visually represent the depth data, a negative version of the image is produce with varying levels of brightness corresponding to varying values of depth (e.g., distance to camera), where closer object appear lighter and objects in the background are darker as shown in by depth sub-frame 400b.

Compared to stereoscopic systems, the depth camera system 102 includes several improved characteristics, for example, the image is illumination-invariant in in-door environments, as long as the environment does not contain light of the same wavelength used for pulse of the sensor; any error in depth is approximately 5~15 mm for 0.5~3 m depth window; depth information is recorded in the separated depth image part 400b (8 bits a pixel). This gives sufficient separation between the hand and the body used for gesture recognition; hybrid sensing, i.e., both depth and color images are captured at real-time speed (e.g., 30 frames/sec); depth for objects with no texture (such as walls) can still be obtained. In one embodiment, all these improved features and other features are provided with a single camera system 102 as opposed to a multi-camera stereoscopic system. The single camera system 102 also provides the additional benefit of obviating the need for calibration between the two or more cameras of a conventional stereoscopic multi-camera system.

In one embodiment, the image data capturing system 102 may preferably include a time-of-flight camera, such as, for example, a camera manufactured by 3DV Systems, of Yokneam, Israel, or Canesta, Inc., of San Jose, Calif. The time-of-flight camera is set to a depth window that includes the area within which the human target being tracked will move about. Non-target objects, e.g., background objects, are not part of the depth image information.

Referring back to FIG. 2, in one embodiment, the data processing system 104 may include an input buffer 141 configured to receive image data from the image data capturing system 102. For example, an input buffer 141 may be included in peripheral interface hardware, network interface hardware (wired or wireless), or the like. Preferably, the image data is received through the input buffer 141 and stored in an internal data storage device 142, e.g., flash, RAM, or the like.

In addition, the data processing system 104 includes several computing modules. For example, in one embodiment a computer processor may implement several functional modules through execution of instructions from one or more software programs. In one embodiment, an image-data pre-processing module 143 accesses the image data from the internal data storage device 142. The image-data pre-processing module 143 applies image processing algorithms to the image data and stores the resulting candidate image data object in the internal data storage device 142. The image processing algorithms may include shape detection, motion detection, and the like. For example, the image-data pre-processing module 143 may process the raw image data to detect regions of an image that are of interest for other modules in the data processing system 104. In one embodiment, the image-data pre-processing module 143 detects pixel regions corresponding to human shapes, e.g., body, head, arms, hands, or the like, in captured images and provides the labeled detected regions for other modules to process.

A shape matching module 144 in the data processing system 104 is coupled to the internal data storage device 142 for access to the image data and candidate data objects. The shape matching module 144 is also coupled to a shape database 148. The shape database 148 is stored in a data storage system 147. For example, in one embodiment, data storage system 147 may be implemented in one or more disk drives.

The shape matching module 144 is configured to identify shapes within the image data for determining gestures given by a user. For example, in embodiments lacking an image pre-processing module 143, the shape matching module 144 may include algorithms for detecting human bodies, heads, arms, hands, and other shapes. In other embodiments, the shape matching module 144 may be configured to detect particular shapes and match the detected shape with a shape or shape profile from the shape database 148. For example, in one embodiment, the shape matching module 144 detects a human hand in an image and compares the shape of the human hand with a hand shape database to find a predetermined shape corresponding to an associated hand-sign from a standard sign language, or a hand command sign database, or the like. The shape matching module 144 may provide additional input data to the stored candidate image data objects, create additional ones, or otherwise provide an output that may be used by other processing system modules.

Preferably, the data processing unit 104 also includes a gesture matching module 145. The gesture matching module 145 accesses the internal data storage device 142 for receiving image data and candidate image data objects. The gesture matching module 145 also accesses a gesture database 149 for comparing stored gesture information profiles with the candidate image data objects. The gesture matching module 145 may provide an output gesture recognition result to an output buffer 146. In one embodiment, the gesture matching module 145 stores its output to the internal data storage device 142 for access by other modules of the data processing system 104. For example, in one embodiment, a gesture-command matching module accesses the gesture recognition output and matches it to a corresponding machine command, for example, a game control command for a gaming application, a motion command to a humanoid robotic system, a volume control command to a sound system (e.g., in a vehicle), or the like.

Figure 3:
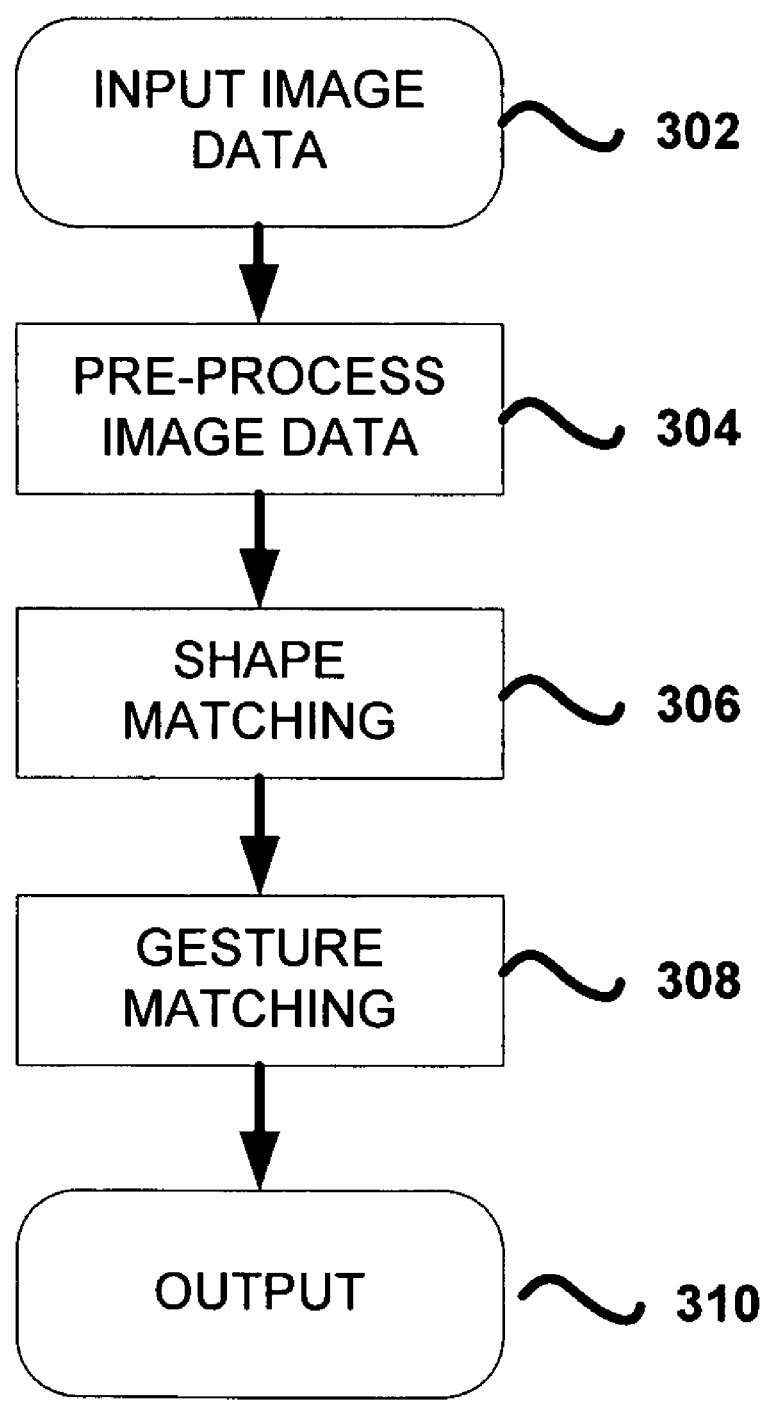
FIG. 3 shows a flow chart of one embodiment of a gesture recognition method.

Referring now to FIG. 3, a flow chart of one embodiment of a gesture recognition method is shown. In this embodiment, image data is input 302 representing a snapshot of a scene. Preferably, the scene includes a human subject providing a gesture command. Gestures may include several associated shapes, locations in the scene, and movement. For example, a hand sign may include an initial hand sign with associated motion to transition to a final hand sign. Further, the hand sign may include a location with respect to other body parts (e.g., head or torso) that may give the sign a distinctive meaning.

1. Image Pre-Processing

In this embodiment, the input image data is pre-processed 304 to detect targets of interest within the scene, e.g., a human. In one embodiment, a human torso and a human head location are identified. Several human detection techniques may be used. For example, in one embodiment, conventional gray image based human detection using templates may be used. The templates are used to extract subsets or regions of a given scene image that correspond to human shapes.

In another embodiment, a human detection technique uses 3-dimensional features of the human upper-body and represents them using the Karhunen-Loeve ("K-L") decomposition. For example, in this embodiment depth information in hybrid depth-image video is exploited to determine the location of the target human. Because the Dmin/Dmax techniques described above can be used to limit the scope of the scene, no special colors, gloves, or the like are required to identify the target.

In one embodiment, to implement the K-L decomposition the input image data is represented as a multi-trace input data set. The K-L decomposition technique computes a set of un-correlated (orthogonal) principal component traces from an eigenvalue decomposition of the matrix of zero lag cross-covariances of the multi-trace input data set. The most coherent events in the input data can then be constructed by summing the principal component (based on Principal Component Analysis or "PCA") traces corresponding to a few of the strongest components. The K-L decomposition is able to represent multiple data points in a compact form.

The following PCA procedure is an example for calculating a pose eigen-space according to one embodiment of the present invention:

Defining m dimensional column vector x, where m=p×q, and p, q are the upper half body image size.

Forming the observation vectors: $\{x_1, x_2, \ldots, x_n\}$ from the sequence of sample images.

Calculating the mean u and covariance matrix $\Sigma$ based on:

$$u = \frac{1}{n}\sum_{i=1}^{n} x_i$$

$$\Sigma = \frac{1}{n}\sum_{i=1}^{n}(x_i - u)(x_i - u)^T$$

Calculating the first largest K eigenvalues $\lambda_j$ and corresponding eigenvectors $\phi_j$ (for j=1, 2, ..., K) of covariance matrix $\Sigma$:

$$\Sigma\phi_j = \lambda_j\phi_j$$

For any image vector x, its K dimensional projection coefficient vectors are calculated by:

$$\omega_j = \phi_j^T(x-u)$$

Figure 5:
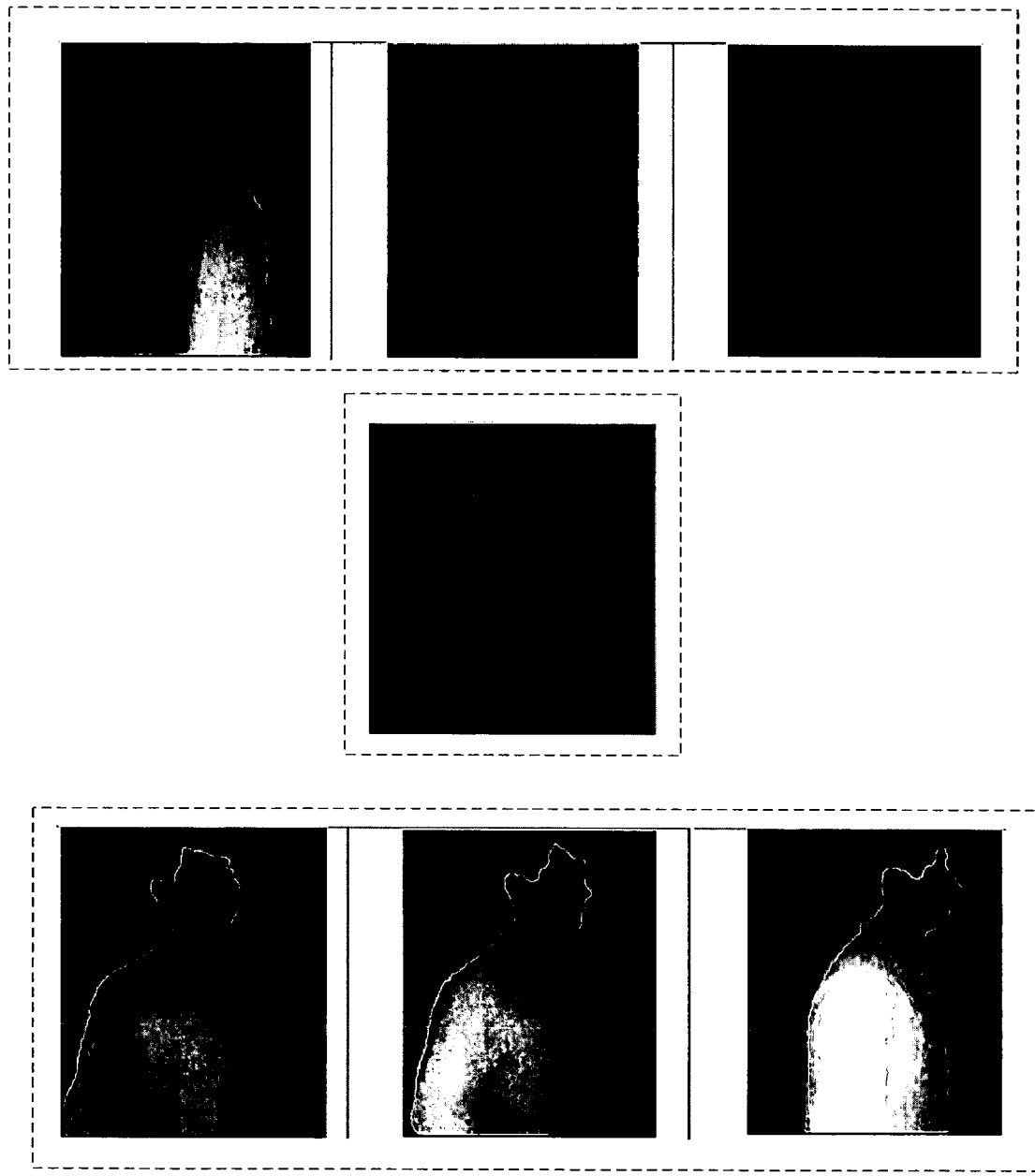
FIG. 5 shows a sample set of training images of a target across a full a range of side-to-frontal views according to one embodiment.

Expressed differently, this PCA procedure is used in one embodiment for extracting the training set and to derive a projection matrix. FIG. 5 shows a sample set of training images of a target across a full a range of side-to-frontal views according to one embodiment. For example, the training set may be captured at a training period by providing instructions to the user to pose in the various pose angles.

This way, the gesture recognition system may be customized to the user, e.g., image recognition can be used for authentication purposes. In one embodiment gray-scale and depth data images are used as a training set over which the K-L decomposition is performed. The training algorithm is based on M training observations $\{x_1, x_2, \ldots, x_M\}$ having known pose angles (distributed within a certain range of angle as shown in FIG. 5), where each observation image $x_i$ is expressed as a column vector with length of N=K×L. The training algorithm includes the following steps:

1. Training Phase:
   Input: Image data points $\{x_1, x_2, \ldots, x_M\}$ in M dimensional image space.
   Output:

$$\underset{N \times P}{U}$$

(projection matrix used in estimation phase).

Step 1: Constructing the Mean Vector ($\bar{x}$) and Covariance Matrix (C):

$$\bar{x} = \frac{1}{M}\sum_{i=1}^{M} x_i, \quad C = \frac{1}{M}\sum_{j=1}^{M}(x_i - \bar{x})(x_i - \bar{x})^t$$

Step 2: Performing PCA Analysis $$\underset{N \times N}{C} = \underset{N \times N}{U}\ \underset{N \times N}{A}\ \underset{N \times N}{U^t} \approx \underset{N \times P}{U}\ \underset{P \times P}{A}\ \underset{P \times N}{U^t}$$

where the first P eigenvectors corresponding to the largest P eigenvalues of C are selected as the optimal linear approximation of eigenspaces.

Step 3: Estimation

For each observation $x_i$, one can project it onto P dimensional eigenspaces, that is:

$$\underset{P \times 1}{w_i} = \underset{P \times N}{U^t}(x_i - \bar{x})$$

2. Estimation Phase:
   Input:

$$w_i, \underset{N \times P}{U},$$

and a new observation y
   Output: Pose of y

Step 4: Pose Estimation for a New Observation y
   Similarly, the new observation is projected onto P dimensional eigenspaces:

$$z = \underset{P \times N}{U^t}(y - \bar{x})$$

One can then make a decision by finding the nearest neighbor $$w = \min_{w_i} \|z - w_i\|.$$

The process described above produces a set of target-specific images that can be recorded in a database for subsequent use in pose estimation for determining the location of a human body within a scene. This process requires the acquisition of the target-specific images with a known pose or orientation. For example, during a training period, a human target is rotated in a full cycle from one extreme orientation (e.g., looking left) to another (e.g., looking right), as for example shown in FIG. 5. In one embodiment, this could be accomplished by instructing a person to rotate from left to right in front of the camera during an initialization of the system while the image data capturing system 102 captures sample training images with known orientation.

Using this approach, based on K-L decomposition, in one embodiment 96 depth images (50×50 in size, taken over 16 views, 6 scales) are represented by ten eigenvectors, which is used as depth templates. Various human depth images can be represented by a linear combination of these depth templates. For a given image, the system first projects all pixel values in the y direction and applies the steps above for K-L decomposition for human body detection to locations that exceed some pre-established threshold.

In one embodiment, once a person is detected in the given scene 400, more analysis may be performed on the image data. The next step may include the detection of major body parts. Assuming that the person is standing and facing towards the image data capturing system 102, the head (or face) of a person in such a standing posture can be identified by applying a projection method, for example, as illustrated in FIG. 6. The head detection of the user is important because some signs have different meanings depending on where the sign command is given relative to the body and head.

Figure 7:
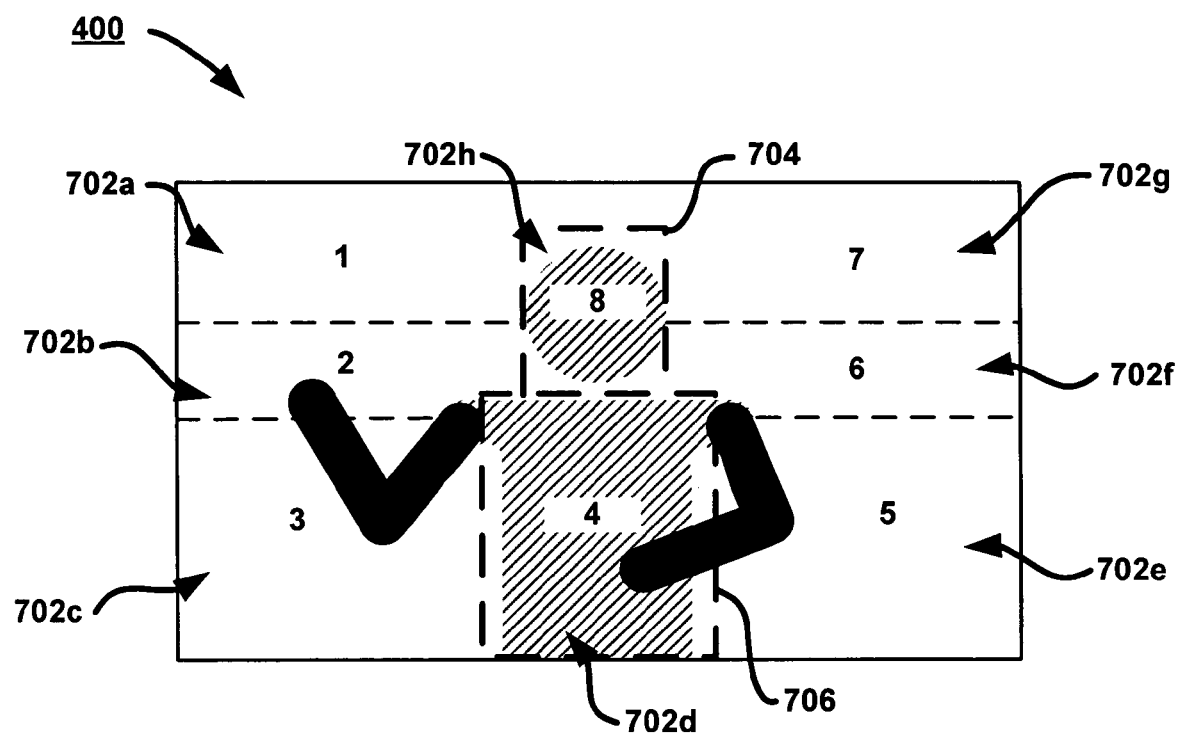
FIG. 7 shows one example of an image scene segmentation into a set of regions according to one embodiment.

FIG. 7 shows one example of an image scene segmentation into a set of regions according to one embodiment. The image scene 400 is divided into 8 regions 702. Each region 702 may have some specific significance with respect to gestures or signs. For example, with respect to sign language, the starting and ending locations for the "think" gesture fall within region 2 702b while the gestures for "hungry" will be confined to region 4 702d. In addition, a head box 704 and a torso box 706 may be defined with respect to the frame 400 to assist in torso and head zone determination, i.e., the system will expect the head and torso to generally fall within the defined boxes for a given application.

Accordingly, in one embodiment one or more of head, torso, arms, and hand locations may be found within the image scene for subsequent processing. In one embodiment, a candidate image data object is created with a set of location fields. For example, a data object may include location of left and right hands with respect to head and/or torso. In one embodiment, the region number or identifier in which hands are located are entered into a field in a candidate image data object.

The regions 702 may also be used to define generalized motion associated with gestures. For example, in one embodiment, a gesture captured over a set of frames 400 may be represented in a candidate image data object with a start region and an end region for a particular hand, e.g., right hand starting at region 2 702*b* ending at region 5 702*e*, which represents a transition or motion from upper right to lower left. Again, with respect to a gesture, this general motion or transition may have a particular significance, which the gesture detection system will be able to identify.

A. Hand Location Detection

One embodiment of a hand-detection method makes use of the results of human detection described above. An alternative embodiment relies on a depth image processing module to determine the hand location within each frame of the scene based on heuristics related to the distance to the camera, e.g., signing hand is likely to be the closest part of the human facing the camera.

In one embodiment, data stored in a candidate image data object derived during the pre-processing of the image data may be used to detect a hand, e.g., by analyzing a region 702 in which the pre-processing module 143 determined a hand to be. In an alternative embodiment, the pre-processing simply determines regions within the image that include body and head. From the given image, the portion that corresponds to the body is then subtracted during the hand detection step. In this embodiment, as the signing hand is usually in front of the body or by the body, it is detected by analyzing the residual blobs of significant size. The average pixel intensity of the residual image is used as a cutoff point to select the hand portion. There are cases where the image generated by this heuristic has arm portion as well as hand. In such a case, the portion corresponding to the arm is further eliminated by selecting pixels based on the area occupied.

Figure 8:
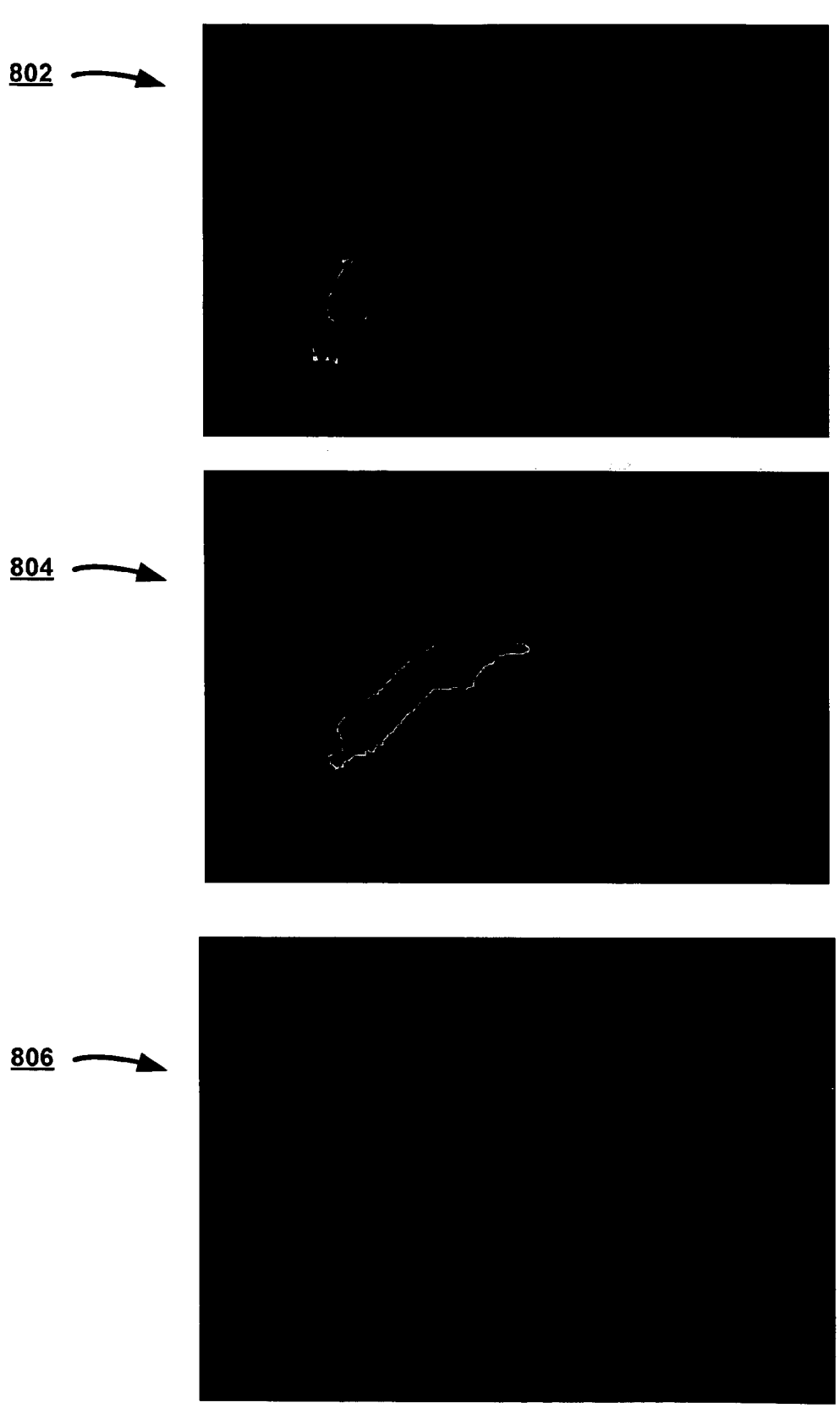
FIG. 8 shows a depth image of a user giving a hand gesture according to one embodiment.

Referring now to FIG. 8, a depth image of a user giving a hand gesture according to one embodiment is shown. Frame 802 shows the entire scene capture by a depth sensing image data capturing system image data capturing system 102. The background beyond the Dmax field is not part of the image data, i.e., pixels with depth values of approximately Dmax. The first step towards recognizing the sign provided by the user is to isolate the arm as shown by image 804. In one embodiment of the gesture recognition system the arm image extraction includes the following:

Step 1: Arm Extraction.

Coarse extraction: When hand is at closer distance to camera than the torso, the arm is extracted by depth difference. When hand is stretch out, hand is extract after erasing face and torso region. The result of this step is an arm image 804. At the same time, face and torso bounding boxes and relevant region information is identified and recorded as described above with respect to FIG. 7. For example, in the scene shown in FIG. 8, the candidate image data object may indicate that the right hand is located in region 4 702*d* of FIG. 7.

Refined arm extraction: Next, the fingertips may be detected from the arm image derived from the coarse extraction step. Then the redundant arm part is deleted by aspect ratio, for example, if the width or height of arm image is larger than 1.5 times the face width, the image is cropped at this point. The result of this step is palm image 806. For a two-hand gesture image, two palm images are similarly derived.

2. Hand Shape Analysis

According to one embodiment, the system applies a method to match unknown target candidate shapes against stored shape data to identify the target candidate shape.

Although for clarity of discussion human hand shapes are discussed with respect to a preferred embodiment, similar techniques can be applied to any number of shapes that may be used for HCI, e.g., hand-held signs or objects, whole body position, kicks, punches, or the like.

The complexity level of hand shape analysis varies from application to application. Some applications, e.g., mimicking mouse operation, require only a few hand shapes, e.g., right/left clicks. On the other hand, other applications require more complex shape and motion analysis and recognition, e.g., sign languages. By way of example, some of the descriptions of embodiments of the invention are described with respect to basic hand patterns used in Japanese Sign Language ("JSL"). JSL has a number of basic hand shapes that are used repeatedly. See FIG. 9 for some examples of Japanese Sign Language hand signs according to one embodiment. Note that shapes 901 and 902 are basically the same shape with different orientation.

A hand shape has different meanings depending on where it appears relative to the body, orientation, and its trajectory. Furthermore, if it is combined with another hand, it has yet other different meanings. Thus, a combinatorial number of words is generated based on various factors. For example, the shape 903 in FIG. 9 alone could have many meanings in JSL including 'I', "you," 'come', 'go', 'tomorrow', 'yesterday', 'which', 'what', 'minute', 'this', 'think', 'sometimes', 'next'.

To accommodate variety of meanings, in one embodiment, the factors analyzed include position, orientation, hand shape types (counting fingers), and trajectory (initial and final positions). For position, in this embodiment, the system uses a rough partition of space as illustrated in FIG. 7. Moreover, in one embodiment, for example, using the skeleton matching techniques described below, various characteristics of the captured hand can be analyzed. For example, as shown in FIG. 11C, a finger analysis may include its width, orientation, and length. A finger information profile collected from such analysis may include the following sample:

| | |
|---|---|
| start_point x/y coordinates: | (7, 19) |
| end_point x/y coordinates: | (44, 18) |
| overall width: | 9.7642 |
| slim_width: | 7.8002 |
| finger length: | 30 |

In addition, in one embodiment, to distinguish between stored shapes for sign recognition, additional factors such as finger angles are measured. The angle between two branches of the finger skeleton can be determined. For example, the branch angles for sign 905 in FIG. 9 and 908 easily distinguish between sign "V" and "L." Similarly, 904 and 911 are distinguished by measuring the distance between the two branches in skeleton. Further, other signs require a more detailed analysis for classification. For example, distinction between signs 907 and 912 relies on branch angles and distances. Such a detailed analysis increases as the number of hand shapes in the recognition set is increased.

There are several methods for shape matching which may be used according to the various embodiments described herein. Generally, the candidate shape and its related information may be composed into a candidate shape data object and compared with a set of shape profiles stored in a shape database. Preferably, the stored shape profiles include information about the stored shapes relevant for comparing, matching, and filtering with respect to candidate shape images.

In one embodiment the Chamfer Distance ("CD") between two images is used, which can also be used to measure shape similarity. CD is defined by using Distance Transform for shape comparison. The result of distance transform is a gradient image where each pixel that corresponds to an edge contains a zero (0) while other pixels contain the CD distance value to the closest edge point.

According to another embodiment, K-L decomposition is also used for shape matching. The K-L decomposition algorithm has some advantages over the CD method. Both methods can include a number of images as templates in the image profiles. A similar template based approach as the one described above with respect to the body part detection algorithm may be used for generating shape image templates. As described above, the K-L algorithm is used to record the needed number of eigenvectors. Conversely, the CD method records every template image in an image format as opposed to the vector format used in the K-L algorithm. Both techniques may be applied in one embodiment, however, the K-L approach significantly reduces the storage capacity required for comparison data. The training sequence in the shape database 148 can be much smaller in a K-L based embodiment.

With respect to similarity measures for comparison of the candidate shape image with the training sequence shape profiles, the K-L method projects the input image on the eigenvectors, while the CD method compares the input image with every template image if the template images are not organized properly. Thus, although either method may be used, the computation load of CD method is generally heavier.

A. Distance Matching Technique

Figure 10:
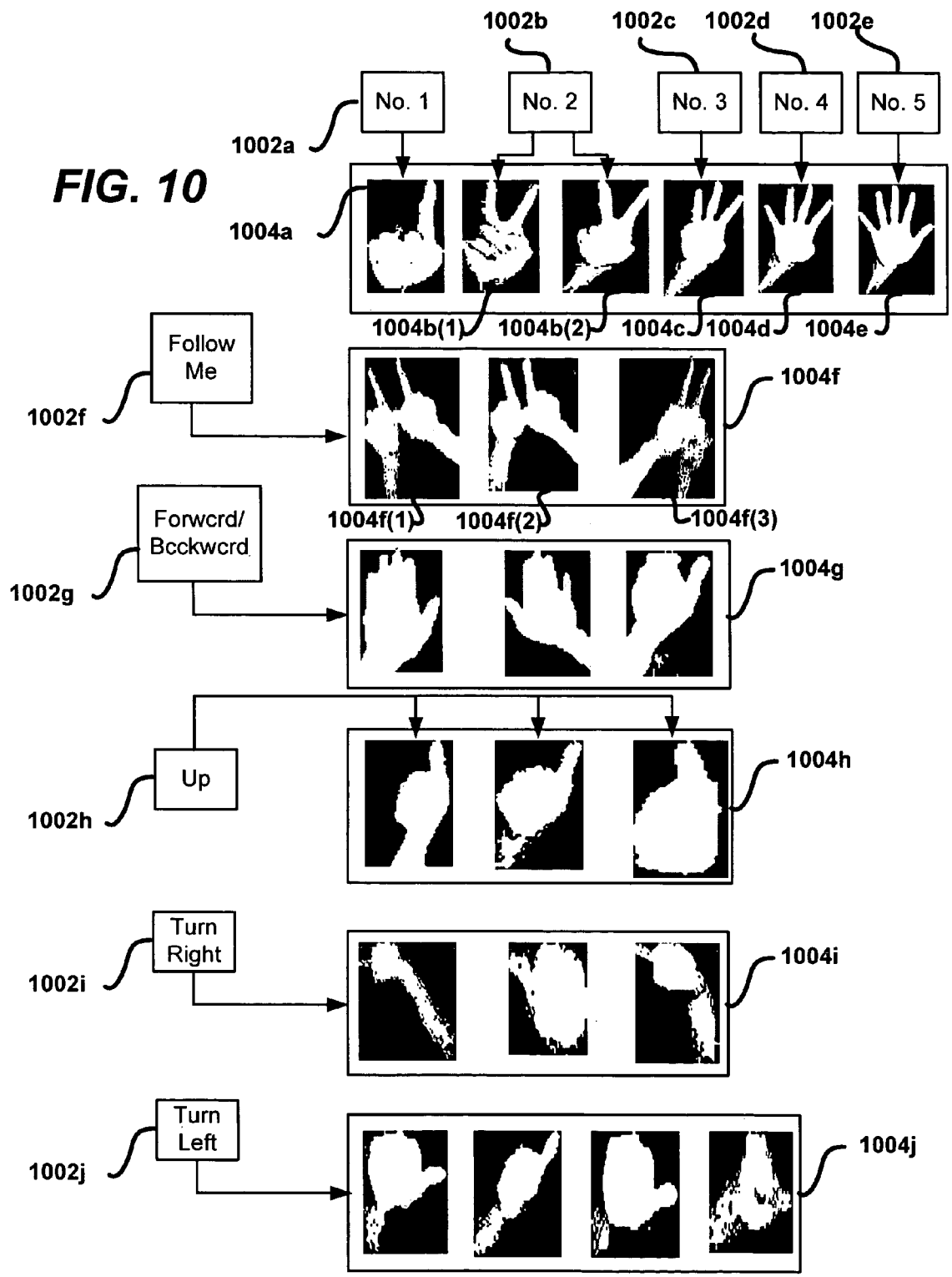
FIG. 10 shows a set of sign records or profiles and corresponding image hand patterns according to one embodiment.

In one embodiment, hand shapes are analyzed with respect to a stored dataset that includes various hand shapes for different gestures. For example, FIG. 10 shows a set of sign records or profiles and corresponding image hand patterns according to one embodiment. Sign profiles include a data record 1002 with a sign definition and additional sign identifying data, e.g., start and end regions, motion, and the like. In addition, sign records 1002 include or point to image files 1004 containing one or more hand patterns images associated with the hand sign. For example, a set of number sign records 1002*a*-1002*e* point to corresponding images 1004*a*-1004*e*. However, with respect to the sign for number 2, sign record 1002*b* points to two image patterns 1004*b*(1) and 1004*b*(2), both of which provide equivalent acceptable matching image patterns. In addition, other more complex signs requiring motions and shape variations may point to a set of images associated with an initial, intermediate, and final image patterns associated with the sign, for example, the "Follow Me" sign 1002 f points to three images in image record 1004*f*, which includes 1004*f*(1), 1004*f*(2), and 1004*f* (3).

To match an unknown hand shape against the stored hand shape data, the Chamfer Distance ("CD") between two images is used to measure shape similarity. CD is defined by using Distance Transform for shape comparison. The result of distance transform is a gradient image where each pixel corresponding to a part of an edge contains 0 while other pixels contain the distances to the closest edge points. To calculate CD between an unknown image X and template Y, we take correlation between the edge image of X and DT of Y.

The smaller the value is, the higher the similarity. We can define such a similarity measure S as:

$$S = \Sigma_i \Sigma_j E(i,j) DT(i,j)$$

where E stands for the edge image of X and DT stands for the gradient image of template Y. We store distance-transformed images for all the shapes in the template dataset. For an unknown hand shape, the similarity calculation as above is conducted and the pattern with the smallest value is chosen as the pattern for this hand. Temporal voting may be used in decision making to reduce the bias created by particular images in the sequence. In an alternative embodiment, the CD hand shape matching technique may be strengthened with a finger-counting algorithm as a pre-filtering of the candidate image in order to expedite and simplify the matching. For example, the sign records 1102 may be associated with a number of fingers. After the finger-counting algorithm determines the number of fingers in the candidate image, it is compared only with the records associated with that number of fingers.

B. Skeleton Matching Technique

Now referring to FIG. 11A-FIG. 11C, images and corresponding processed image data illustrating a skeleton based hand shape matching technique according to one embodiment are shown. In one embodiment, after the pre-processing provides image data corresponding to target hands, a man-machine gesture recognition system analyzes the hand image data. In this embodiment, the hand shape analysis based on skeleton matching techniques comprises the following steps.

Skeleton Generation

The palm image shown in FIG. 11A is threshold to result in binary image, then the edge of the binary image is smoothed and then reduced to small branches according to conventional skeleton generation techniques. The result of this step is skeleton image as shown in FIG. 11B.

After the skeleton is derived, the end points and intersection points in the skeleton image are identified for every line segment of finger in the skeleton, generally defined by an end and intersection points. End point/intersection point pairs are determined in the image. Then the Euclidean distances between the points for every point pair are recorded. If the Euclidean distance is too small (e.g. 1~2 pixels, threshold depends on image size), the line segment between the end point and intersect point pair is deleted (i.e., too small to be a real element of the hand). After every erasing operation, identify end points and intersection points again. The result of this step is end point and intersection point pairs with Euclidean distance longer than threshold resulting in the finger skeletons as shown in FIG. 11B.

For every end point and intersection point pair, find a path in the skeleton image between them. Then, count the width, length and orientation angle of this path in the binary image as shown in FIG. 11C. There are two width parameters of each path, one is the average width for the path (width-1), the other is the average of sub-path whose width is smaller than a width threshold (determined by palm width) (width-2). In one embodiment, the result from this step is a data structure recording properties about each path, such as for example, end point coordinate, intersect point coordinate, orientation, widths, length, and the like.

Finger recognition: According to one embodiment, for every path in the skeleton, the path's length, width-1, width-2 are determined, where width-1 and width-2 refer to, for example, overall width and slim width respectively of the finger candidates. In addition, in one embodiment, based on the measured properties it may be determined whether the path corresponds to a finger or not. The result from this step includes the number of fingers and a data structure may be used to record significant data about each finger. For example, a finger information section in the candidate image data structure for a candidate image or gesture may be used to record the finger information.

The skeleton matching technique is rotation invariant. Accordingly, two hands at different angles may be recognized as the same based on the finger counts and the relative angles among them. By contrast, using the CD method hands at different angle are not determined to be the same. However, the skeleton based method may perform better than CD method at the cost of more computation load. In one embodiment, for hand shape analysis, a real-time tracking of multiple fingertips is also used to strengthen the finger-counting part of conventional skeleton algorithms.

C. Shape Information Integration

In one embodiment, using an image of the candidate target hand from the initially captured scene, the system extracts basic information for the hand or palm. This information may include, among other things, area, bounding box, orientation angle, face box, torso box, palm centroid, average depth value, distance of palm to torso center, distance of palm to face center. The information is determined through image processing techniques and collected into a candidate image data object. The candidate image data object may include additional information collected in previous steps, e.g., pre-processing location of body, head, hand, and the like. In one embodiment, the candidate image data object includes a palm information section for storing determined palm data that may subsequently be used for sign or gesture matching.

According to this embodiment, using the recognized fingers from the skeleton processing, the system records the finger structure as a property for the palm. Accordingly, a multi-level structure as shown in Table 1 may be defined with respect to the candidate image data object.

In addition, in one embodiment, for matching more complex gestures that include several shapes, the above steps are repeated through all images for the gesture. In this embodiment, all the information about the hand or palm in every image is recorded into a structure of Palms associated with the candidate gesture data object.

TABLE 1

| PALM SECTION OF CANDIDATE IMAGE DATA OBJECT | | | |
|---|---|---|---|
| PALM | Area | | |
| | Bounding box | | |
| | Centroid | | |
| | Type (left or right hand) | | |
| | Orientation | | |
| | Face box | | |
| | Torso box | | |
| | Average depth value | | |
| | Distance to face | | |
| | Distance to torso | | |
| | Fingers | Finger number | |
| | | Finger_1 | Start point |
| | | | End point |
| | | | Width_1 |
| | | | Width_2 |
| | | | Finger length |
| | | | Orientation |
| | | Finger_2 | . . . |
| | | Finger_3 | . . . |
| | | . | . |
| | | . | . |
| | | . | . |

D. Trajectory Determination

In one embodiment, one or more shapes may be associated with a trajectory in order to define a gesture. For example, in one embodiment, a hand moves in space creating a curve or trajectory in a 3D space with time information associated to it. FIG. 12 shows one sample line chart of a three dimensional trajectory of a hand according to one embodiment. In one embodiment, the gesture matching process includes trajectory information. However, to simplify the matching the trajectory information is decoupled into three parts, X motion, Y motion, and Z motion. X and Y are the horizontal and vertical coordinates of the hand in the image plane, while Z is represented by the mean depth value of the hand to indicate the distance to the camera system.

In one embodiment, in order to match the trajectory information to stored gesture trajectory information the following threes steps are implemented:

1. The X, Y, and Z components of each hand movement are matched against template curves (which are normalized to a uniform time interval [0,N], where N is the number of sampled points). FIG. 13 shows some example template patterns for X, Y, and Z curves according to one embodiment. The curve patterns 1301 correspond to actions such as "push and return pattern" 1301a, "push, hold, and return pattern" 1301b, "push, return, pull, and return pattern" 1301c. The curves 1301 have been smoothed by using FFT to reduce local noise before normalization.

2. For curve matching, only significant movements in each dimension are considered to avoid error due to small direction variations. For example, for the "back up" gesture, the hand mainly moves forward from torso towards the camera direction. However, there may also be some horizontal and vertical displacement of the hand in the image plane, but such a displacement is negligible, thus it is ignored and excluded from consideration.

3. For any non-negligible movement, a candidate curve captured by the system is compared with all templates in the curve dataset. In one embodiment, the minimum square error computation is used to compute similarity between candidate and template curves. Namely, for an unknown candidate curve Y(t), t=0,1, . . . , N and a template curve 1301 S(t), t=0,1, . . . , N, the minimum square error ("MSE") may be computed as follows:

$$MSE = \sum_{t=1}^{N} [Y(t) - S(t)]^2$$

The smaller the computed MSE is the higher the degree of similarity between the candidate and template curves. Once all the templates are compared with the candidate, the template corresponding to the smallest MSE is selected and assigned to the candidate for identification of the corresponding gestures.

Figure 14A:
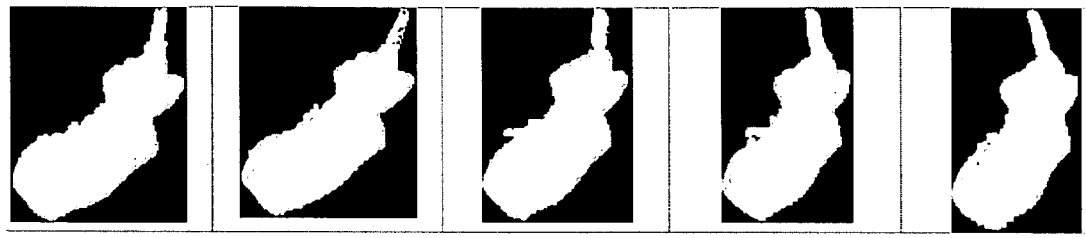
FIG. 14A shows a frame series of images of a non-static hand sign according to one embodiment.
Figure 14B:
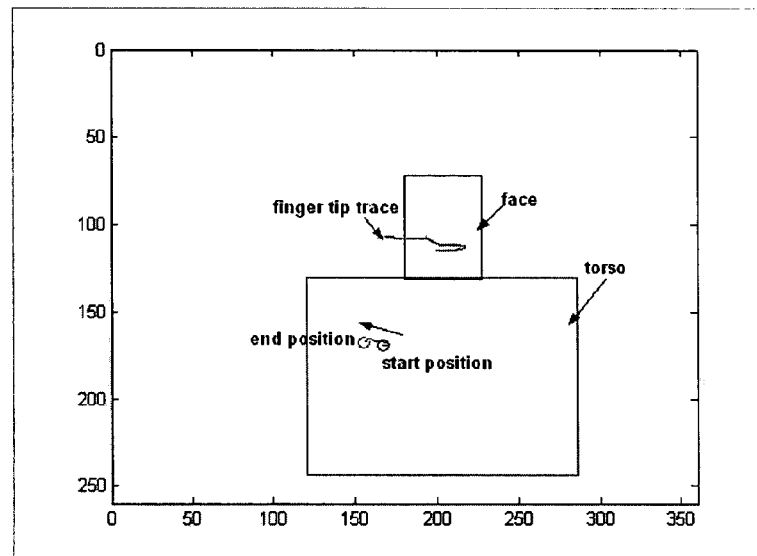
FIG. 14B shows a pixel chart illustrating hand trajectory recorded in X, Y, and Z directions from the starting point to the ending point for the series of frames of FIG. 14A.
Figure 14C:
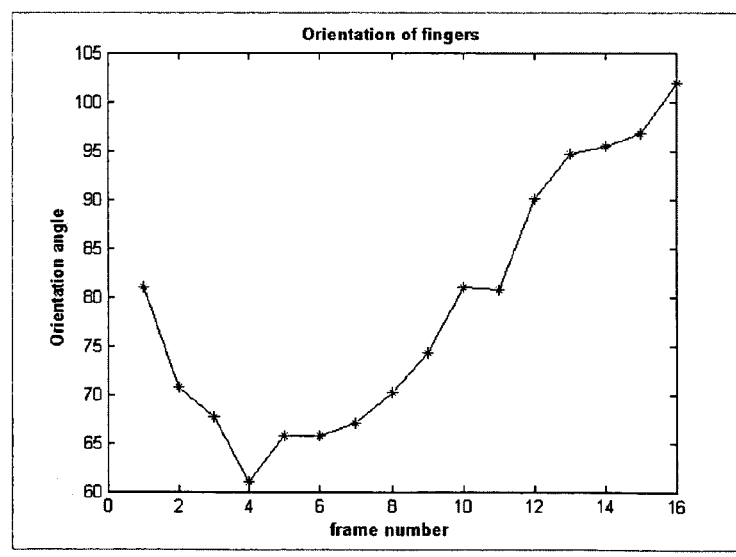
FIG. 14C shows a chart of orientation angle change over frames illustrating the finger orientation angle tracking in the frame series of FIG. 14A.

For example, with reference to FIG. 14A showing a frame series of images of a non-static hand sign, in one embodiment, for non-static signs or gestures the system records the start and end points of particular fingers (e.g., extreme points of a stroke) in a series of frames. Hand trajectory is recorded in X, Y, and Z direction from the start point to the end point for the series of frames as shown in FIG. 14B. The finger orientation angle is also tracked in the frame series as shown in FIG. 14C.

E. Hand Orientation Determination

Figure 15:
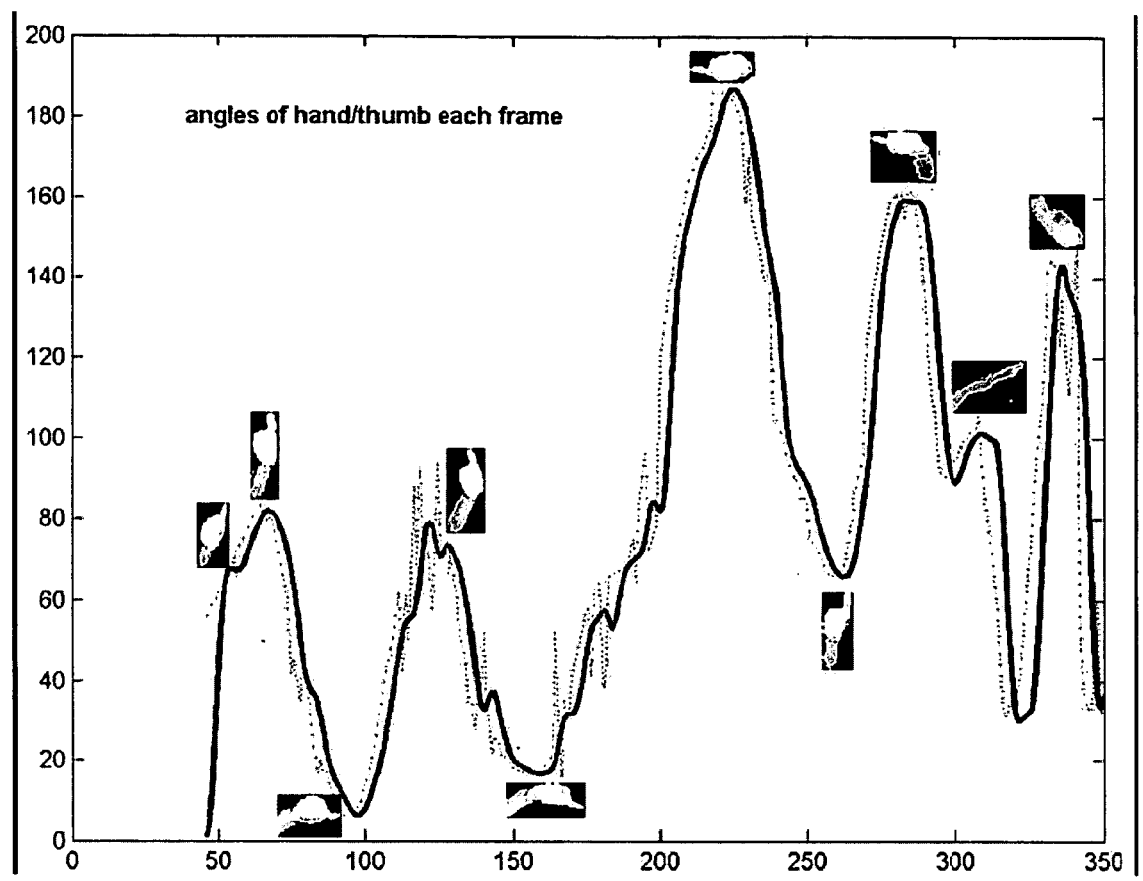
FIG. 15 shows a curve/image diagram of the result of hand orientation analysis for a "thumb-up" hand pattern according to one embodiment.

In one embodiment, orientation of the hand may also be captured. For example, as shown in FIG. 14C, finger orientation may be relevant for some gestures or signs, e.g., thumb-up versus thumb-down gestures. Accordingly, in one embodiment, once a relevant hand shape is determined, e.g., start hand shape for thumb-up gesture, hand orientation for the target candidate image shapes is captured. FIG. 15 shows a curve/image diagram of the result of hand orientation analysis for a "thumb-up" hand pattern according to one embodiment. Hand orientation information may be obtained by examining the major axis of the region for the hand shape. For example, based on the skeleton analysis described above, the major axis of the arm and fingers may be used and the angle variation measured with respect to head, torso, or an initial position may be derived from the image data.

Gesture Matching

After the candidate image or frame series information of the target is collected into one or more data objects, a gesture matching process is applied to determine the sign or gesture provided to the recognition system. In one embodiment, hand shape information and trajectory information is recorded in a candidate image data object which is used to classify the sign or gesture represented by the image data. The feature information collected into the candidate data object is analyzed and compared with stored gesture/sign profiles that include relevant information about the stored patterns. The information in the gesture or sign profiles may be used for comparing, matching, or filtering with respect to the information in the candidate data objects. For example, in one embodiment, a gesture profile is represented as a set of n attributes in a data object, for example 5 attribute-value pairs may be used to represent a gesture ("G") in the form of G=<shape, location, trajectory, orientation, speed>, where for each gesture a unique combination of values for these attributes defines the gesture.

Since each attribute can distinguish a few to several stored training patterns, the n dimensional space G (e.g., n=5) can easily contain several dozen gesture patterns.

In one embodiment, to facilitate the recognition of gestures intended for the interaction with the machine, a gesture delimiter sign may be used at the beginning and the end of a gesture to indicate to the machine that the gestures provided in-between are intended for communication with the gesture recognition system. In an alternative embodiment, the gesturing hand is removed from the field of vision of the machine after the end of a gesture. This approach can also be used as a gesture delimiter. For example, in a series of 300 frames (10 seconds) captured by a image data capturing system 102, for a first set of frames, e.g., 1-130, a hand moves forward and backward in the Z direction. Then for the next set of frames, 130-180, no hand is detected. After frame 180, the hand again moves forward and keeps still at a fixed depth value from frames 200-260. Thus, frames 130-180 can be interpreted as a delimiter between two gestures and the image data may be processed accordingly.

Figure 16:
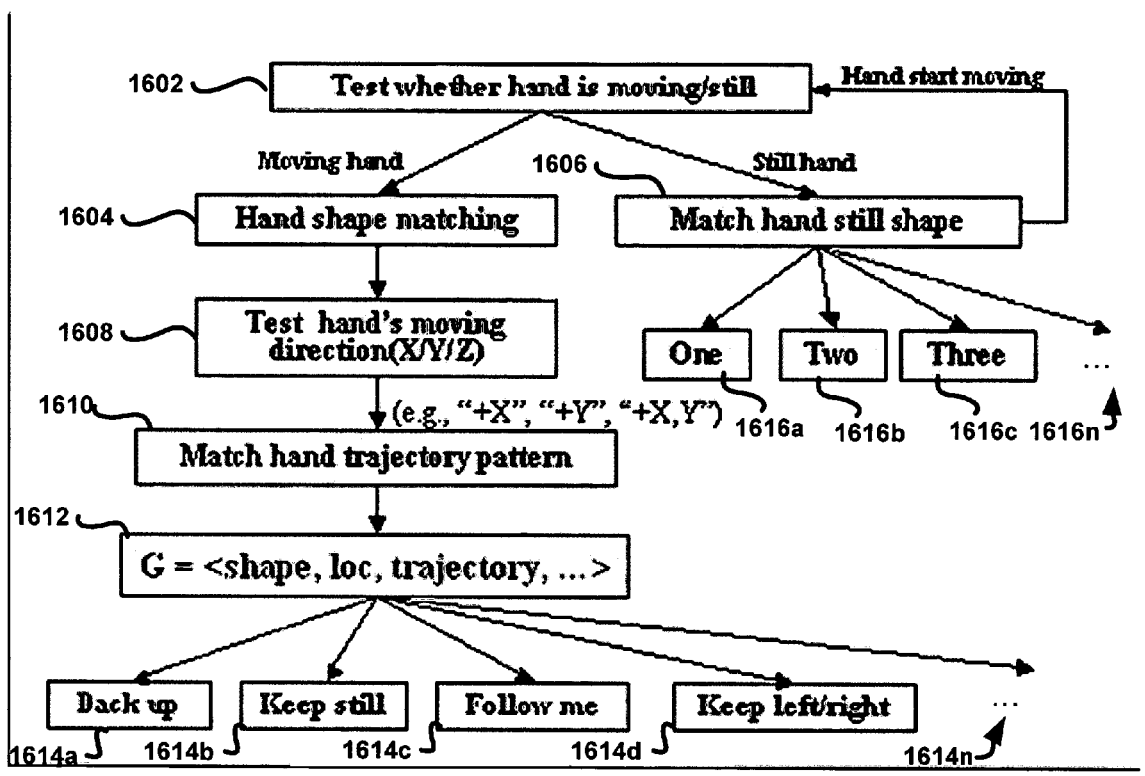
FIG. 16 shows a flow diagram to illustrate the steps for gesture recognition according to one embodiment.

To understand natural continuous human gestures, methods such as Hidden Makov Model ("HMM") are to be considered. FIG. 16 shows a flow diagram to illustrate the steps for gesture recognition according to one embodiment. While image data is received from a depth video source, the hand location is checked to determine 1602 whether the hand is still or in motion. For a moving hand, shapes for gestures that involve motion are used for matching 1604 the shapes in the candidate video frames. For example, hand gesture templates in a hand gesture database may be used in matching 1604 the hand gesture. The trajectory of the hand is captured 1608 by testing moving directions (X, Y, and Z). Once the trajectory of the candidate gesture frames is determined, it is matched 1610 as discussed above with stored trajectory patterns. Once shape, location, and trajectory are determined, a gesture matching 1612 process takes place based on the candidate image data object(s) as further explained below. The output gesture is determined 1614 from the gesture database.

If the hand is not moving, gestures or shapes that do not involve motion are used to match 1606 the still hand shape candidate image as described above, e.g., CD, K-L, skeleton, or similar method. From the shape matching 1606 process, a sign is determined 1616 selected from the stored signs.

In one embodiment, gesture trajectories are classified into a number of pre-determined patterns, for example, within the gesture profiles. After various features have been collected, a recognition table, such as for example Table 2 shown below, is used to identify corresponding gestures or signs.

TABLE 2

Sample JSL Sign Recognition Information

| Gesture | Message | In 2 days | A bit | Monday | Airplane | Taxi | Again |
|---|---|---|---|---|---|---|---|
| 2 Hands | YES | NO | NO | NO | NO | NO | NO |
| Fingertip Distance | NO | NO | YES decreasing | YES increasing | NO | NO | NO |
| Motion in X direction | NO | NO | NO | NO | NO | NO | YES increasing |
| Motion in Y direction | NO | NO | NO | YES increasing | YES decreasing | NO | YES increasing |
| Motion in Z direction | YES decreasing | YES increasing | YES decreasing | NO | NO | NO | NO |
| Hand Shape | L shape | V shape | Thumb + Index | L shape | Thumb + Pinky | Thumb + Pinky | Horizontal V |
| Orientation | Vertical | Vertical | Vertical | Vertical | Vertical | Vertical - 45-60 deg | Vertical - horizontal |
| Shape Change | NO | NO | NO | NO | NO | NO | Fist to horiz. V |

According to one embodiment, the system checks the information in a Palms structure as defined above to find out whether this gesture is one-hand gesture or two hand gesture, and record this property in twoPalmCode variable (0—one-hand gesture, 1—two-hand gesture). At the same time, find out the dominating finger number in the Palms structure, if most finger number for each palm is one, then classify into one finger gesture group, and so on. Variable mostFingerNumber is used here.

In this embodiment, regardless of which finger group the gesture falls in, the system checks the following property about palm:

Record X,Y,Z (depth), orientation angle of palm in the image palm. Check the movement style.

0—remain stable; 1—decreasing; 2—increasing;

1*—decreasing first, the move increasing/decreasing cycle * times;

2*—increasing first, the move decreasing/increasing cycle * times;

Check the palm position trajectory, the start position, end position and most likely position. Please see the FIG. 1 to see the definition of position.

Check the change of average finger length, since some gesture only have finger length changing, e.g., 40.

In one embodiment, these properties are recorded in several separate structures, including Coordinate, CoordChg, Position, FingerLength.

According to this embodiment, the gesture recognition system derives hand shape properties, including start hand shape, end hand shape, most likely hand shape, hand shape change code, and the like. These properties are recorded in another data structure, HandShape. Table 3 describes the properties used for hand shape recognition.

TABLE 3

HAND SHAPE RECOGNITION

| Finger # | Hand shape | Criteria |
|---|---|---|
| 1 | Pointing finger | [Finger length]/[face width] > 0.45 |
|  | Little finger | [Finger length]/[face widthp < 0.45, Finger orientation close to palm orientation. |
|  | Thumb only | [Finger length]/[face width] < 0.45, Orientation difference between Finger and palm is not negligible. |
|  | Thumb + open palm | [Finger length]/[face width] < 0.45, [Palm area]/[face area] > 1 |
| 2 | V shape | [angle difference btw 2 fingers] > 25, <50 |
|  | Horizontal V | Horizontal finger orientation (~0) |
|  | Vertical V | Vertical finger orientation (~90) |
|  | Inverted V | Vertical finger orientation (~−90) |
|  | Thumb + little | [angle difference btw 2 fingers] > 90 |
|  | Pointing + little | [angle difference btw 2 fingers] > 50, <60 |
|  | L shape | [angle difference btw 2 fingers] > 60, <90 |
| 3 | 3 longest fingers | [mean(finger lengths)/face width] > 0.45 |
|  | Horizontal | Horizontal finger orientation (~0) |
|  | Vertical | Vertical finger orientation (~90) |
|  | Inverted | Vertical finger orientation (~−90) |
|  | pointing + middle + thumb | [mean(finger lengths)/face width] < 0.45 |
| 4 | Fingers except thumb | [mean(finger lengths)/face width] > 0.42 |
|  | Fingers except little | [mean(finger lengths)/face width] < 0.42 |
| 5 | Star shape | — |

A special property for two finger gesture group includes whether the distance between two fingers changes or not. This is recorded in structure DistanceBtw, for example, as 0—remain stable; 1—decreasing; 2—increasing.

In one embodiment, the combined gesture information is recorded into gesture data structure, for example as shown in Table 4. The gesture data structure may be part of a gesture profile associated with the gesture that is stored in a gesture database.

TABLE 4

GESTURE INFORMATION

| GESTURE | | | |
|---|---|---|---|
| | twoPalmCode | | Possible value: 0, 1 |
| | mostFingerNumber | | Possible value: 1, 2, 3, 4, 5 |
| | DistanceBtw | distanceBtwFingers | Array to record distance btw 2 fingers in every palm. |
| | | distanceChgCode | Possible value: 0, 1, 2 |
| | Coordinate | palmXCoord | Array to record X coordinates |
| | | palmYCoord | Array to record Y coordinates |
| | | palmZCoord | Array to record Z coordinates |
| | | palmAngle | Array to record palmorientation |
| | CoordChg | palmXCoordChgCode | Possible value: 0, 1, 2, 1*, 2* |
| | | palmXCoordChgCode | Possible value: 0, 1, 2, 1*, 2* |
| | | palmXCoordChgCode | Possible value: 0, 1, 2, 1*, 2* |
| | | palmAngleChgCode | Possible value: 0, 1, 2 |
| | HandShape | handShapeList | Array to record hand shape in every palm |
| | | startHandShape | Dominating hand shape in first few frames |
| | | endHandShape | Dominating hand shape in last few frames |
| | | mostLikelyHandShape | Dominating hand shape in all the frames |
| | | handShapeChgCode | Possible value: 0, 1 |
| | Position | startPosition | Dominating position in first few frames |
| | | endPosition | Dominating position in last few frames |
| | | mostLikelyPosition | Dominating position in all the frames |
| | FingerLength | fingerLengthArray | Array to record average finger length in every palm |
| | | fingerLengthChgCode | Possible value: 0, 1 |

Instructions to Robots

Using speech is a good method to give instructions to robots. Practically, however, current speech recognition has certain limitations that make it an undesirable method to communicate with robots. Due to environmental and robot-induced noise, audio signals generated by a human user (even when he is only a few meters away from the robot) are not sufficiently clear for robot perception.

Conversely, signs are usable in many instances. For robots that serve in an office environment, in addition to simple motion commands such as 'back up 3 steps', we could find the following phrases handy: "When is the meeting?;" "Take him to Mr. Smith's office;" "Repeat my instruction;" "Pick up my suitcase and follow me;" "What's boss's message?" "Greet the guest;" and "Go to the second floor." According to one embodiment, a sign vocabulary based on JSL is provided to enable a robot to interpret basic words used in this type of instructions. Moreover, by adding certain reserved words such as "if," "then," "while," sentences such as "if Mr. Smith comes, then call me."

For example, in one experimental embodiment, a set of motion gesture command set was developed for the ASIMO humanoid robot. The gestures included those listed in Table 5.

TABLE 5

ASIMO BASIC MOTION GESTURE COMAND SET

| | |
|---|---|
| Three steps forward | Quick/Slow/Regular |
| Five Steps back | Spin 40 degrees |
| Action 7 | Look there |
| Follow | Hear him |
| Repeat | Go second floor |
| 5 minute break | 1 minute later begin |
| Come back in 2 minutes | Again |
| Greeting | Quiet |
| Catch | Remember him |
| Ok/Bye | Where is the Meeting? |
| What's the message? | What's news? |
| Up/Down/Two days ago/In two days | Telephone |

In this experimental embodiment, using sign commands beginning with a delimiter (such as motion-less time interval), the gesture commands of Table 5 were interpreted correctly by a software based experiment with only an error rate of 5% or less.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for man-machine interaction comprising the steps of:
   receiving a digital image of a target, the digital image comprising depth data associated with image pixels, the depth data corresponding to the distance to a camera capturing the digital image;
   determining a location of a hand of the target within the pixels of the image based on the depth data associated with each of the pixels and a shape of the target;
   pre-processing the digital image of the target by matching a candidate shape of the target captured in the digital image with a stored shape image from a plurality of shape images by comparing one or more of the plurality of stored shape images with the candidate shape, wherein comparing includes forming a vector with the depth data associated with each of the pixels associated with the candidate shape and computing a match based on a matrix of projection coefficient vectors representing the plurality of stored shape images; and
   matching a candidate shape of the hand by generating a skeleton representation of the hand from the image pixel data of the location of the hand and determining one or more hand attributes from the skeleton representation, including at least a number of fingers.

2. The method of claim 1, wherein matching the candidate shape of the hand further comprises:
   determining an edge of the hand in the determined location of the image;
   applying a pixel distance transform to the image with respect to the edge of the hand to compose a candidate edge image, wherein the one or more of the plurality of stored shape images include edge pixel distance transforms of the images for comparing with the candidate shape based on a projection of the candidate shape image over the stored shape images to determine a similarity value based on the correlation between the candidate edge image and the distance transforms of the stored images.

3. The method of claim 1, wherein determining a location of a hand of the target further comprises:
   dividing the digital image in a plurality of predetermined regions;
   associating a predetermined region with a location of the hand; and
   determining one or more regions associated with at least one of a location of the target's head or a location of the target's torso, wherein the one or more of the plurality of stored shape images for comparing with the candidate shape include region information defining hand locations associated with the shape.

4. A computer based method for man-machine interaction comprising the steps of:
   receiving a digital image of a target, the digital image including depth data associated with each pixel and being indicative of the distance to a camera capturing the digital image;
   pre-processing the digital image to determine a location of at least a hand and at least one of a head or a torso of the target based on the depth data associated with each pixel;
   matching a shape of the hand with one of a plurality of stored hand shape images to provide a matched shape associated with the digital image, wherein matching includes forming a vector with the depth data associated with each of the pixels associated with the location of the hand and computing a match based on a matrix of projection coefficient vectors representing the plurality of stored hand shape images;
   creating a candidate image data object including information associated with the location of a hand with respect to one of a head or a torso of the target and information indicating the matched shape associated with the digital image;
   matching a gesture captured by one or more digital images with a template gesture by comparing the candidate image data object with one ore more stored gesture profiles for template gestures, the gesture profiles including hand to body part location information and hand shape information for comparing with the candidate image data object; and matching a candidate shape of the hand by generating a skeleton representation of the hand from the image pixel data of the location of the hand and determining one or more hand attributes from the skeleton representation, including at least a number of fingers.

5. The method of claim 4, wherein pre-processing includes a training process comprising:

performing a principal component analysis of a training set of images with known poses of the target to derive a derive a projection matrix; and determining a pose of the target in the digital image by projecting a vector corresponding to a candidate pose of the target based on the projection matrix and finding a nearest neighbor in the training set with a known pose.

6. The method of claim 4, wherein the candidate image data object further comprises a palm information section and a finger information section, the palm information section comprising shape information, orientation information, and trajectory information, the finger information section including number of fingers and direction of the fingers.

7. The method of claim 4 wherein the digital image of the target comprises hybrid depth-image information.

8. The method of claim 7, wherein pre-processing includes analyzing the hybrid depth-image information to determine location based on distance of the target to an image capturing system.

9. The method of claim 4, wherein matching the gesture captured by one or more digital images with a template gesture further comprises comparing values associated with one or more attributes from the group consisting of number of hands used, number of fingers used, distance between fingers, hand location, hand location variation, shape of hand information, and finger information.

10. The method of 9, wherein the shape of hand information further comprises one or more attributes from the group consisting of number of fingers, finger identifiers, finger shapes, and finger orientations.

11. A computer based method for human-machine interaction comprising:

matching a hand shape captured in one or more digital images with a plurality of hand shape patterns to determine a candidate gesture hand shape, each of the one or more digital images including depth data associated with each pixel indicative of the distance to a camera capturing the digital images, wherein matching includes forming a vector with the depth data associated with each of the pixels and computing a match based on a matrix of projection coefficient vectors representing the plurality of stored hand shape patterns;

determining a trajectory curve of the hand from the one ore more digital images;

matching the trajectory curve of the hand with a plurality of trajectory curve templates to determine a candidate gesture motion;

determining a gesture corresponding to the candidate gesture hand shape and the candidate gesture motion by comparing the candidate gesture hand shape and the candidate gesture motion with a plurality of gesture profiles with associated gesture hand shapes and gesture motions; and matching a candidate shape of the hand by generating a skeleton representation of the hand from the image pixel data of the location of the hand and determining one or more hand attributes from the skeleton representation, including at least a number of fingers.

12. The method of claim 11, further comprising:

determining whether the hand shape captured in the one or more digital images is still; and in response to determining the hand shape to be still matching the hand shape with a plurality of hand shape patterns corresponding to still gestures to determine the gesture.

13. A system for human-machine interaction comprising:

an image data pre-processing module for receiving frames of image data comprising human image information, each of the frames of image data including depth data associated with each pixel indicative of the distance to a camera that captured the frame, the image pre-processing module configured to determine locations of one or more body parts of the human in the frames based on the depth data associated with each pixel;

a shape matching module coupled to the image data pre-processing module for receiving the determined locations and configured to match a shape of at least one of the body parts by comparing information associated with the image data with stored shape profiles in a shape database, wherein comparing includes forming a vector with the depth data associated with each of the pixels associated with a determined location of one or more body parts and computing a match based on a matrix of projection coefficient vectors representing the plurality of stored body part shape images; and a gesture matching module coupled to the image data-preprocessing module and the shape matching module for receiving shape and location information, the gesture matching module configured to match a gesture of the at least one body part by comparing gesture attributes of the at least one body part with gesture profiles stored in a gesture database, the gesture attributes comprising values associated with body part locations, and shape information, the gesture matching module further comprising a hand shape matching module configured to match a candidate shape of the hand by generating a skeleton representation of the hand from the image pixel data of the location of the hand and to determine one or more hand attributes from the skeleton representation, including at least a number of fingers.

14. The computer based system of claim 13, further comprising an image data capturing system, the image data capturing system configured to capture hybrid image-depth information of a scene within a range of depths from the image data capturing system.

15. The computer based system of claim 14, wherein the image data capturing system comprises a time-of-flight camera configured to capture the hybrid image-depth information along a single optical axis.

16. The computer based system of claim 13, further comprising a data storage system coupled to the shape matching module and the gesture matching module, the data storage system comprising the shape database and the gesture database.

17. The computer based system of claim 13, wherein the coupling between the image data pre-processing module, the shape matching module, and the gesture matching module comprises a random access memory device.

18. A computer readable media for human-machine interaction comprising:

program instructions for receiving a digital image of a target, the digital image including depth data associated with each pixel indicative of the distance to a camera that captured the digital image;

program instructions for pre-processing the digital image to determine a location of at least a hand and at least one of a head or a torso of the target based on the depth data associated with each pixel;

program instructions for matching a shape of the hand with one of a plurality of stored hand shape images to provide a matched shape associated with the digital image, wherein the program instructions for matching include program instructions for forming a vector with the depth data associated with each of the pixels associated with the location of the hand and for computing a match based on a matrix of projection coefficient vectors representing the plurality of stored hand shape images;

program instructions for creating a candidate image data object including information associated with the location of a hand with respect to one of a head or a torso of the target and information indicating the matched shape associated with the digital image;

program instructions for matching a gesture captured by one or more digital images with a template gesture by comparing the candidate image data object with one ore more stored gesture profiles for template gestures, the gesture profiles including hand to body part location information and hand shape information for comparing with the candidate image data object; and program instructions for matching a candidate shape of the hand by generating a skeleton representation of the hand from the image pixel data of the location of the hand and determining one or more hand attributes from the skeleton representation, including at least a number of fingers.

19. A computer based system for human-machine interaction comprising:

means for receiving a digital image of a target, the digital image including depth data associated with each pixel indicative of the distance to a camera that captured the digital image;

means for pre-processing the digital image to determine a location of at least a hand and at least one of a head or a torso of the target based on the depth data associated with each pixel;

means for matching a shape of the hand with one of a plurality of stored hand shape images to provide a matched shape associated with the digital image, wherein the means for matching include means for forming a vector with the depth data associated with each of the pixels associated with the location of the hand and means for computing a match based on a matrix of projection coefficient vectors representing the plurality of stored hand shape images;

means for creating a candidate image data object including information associated with the location of a hand with respect to one of a head or a torso of the target and information indicating the matched shape associated with the digital image; and means for matching a gesture captured by one or more digital images with a template gesture by comparing the candidate image data object with one ore more stored gesture profiles for template gestures, the gesture profiles including hand to body part location information and hand shape information for comparing with the candidate image data object; and means for matching a candidate shape of the hand by generating a skeleton representation of the hand from the image pixel data of the location of the hand and determining one or more hand attributes from the skeleton representation, including at least a number of fingers.

20. A computer based method for man-machine interaction comprising the steps of:

receiving a digital image of a target having a hand, the digital image comprising depth data associated with image pixels, the depth data corresponding to the distance from the target to a camera capturing the digital image;

determining a location of a hand of the target within the pixels of the image based on the depth data associated with each of the pixels; and generating a skeleton representation of the hand from the image pixel data of the location of the hand, wherein generating includes determining characteristics of a first skeleton representation of the hand and applying a rule to the determined characteristics to delete at least one line segment in the first skeleton representation resulting in a second skeleton representation, wherein generating includes: determining an end point and an intersection point for a line in the first skeleton representation of the hand; determining the distance from the end point to the intersection point of the line; comparing the distance to a distance threshold characterizing a minimum distance for a finger; and deleting the line in the first skeleton representation based on the comparison to the distance threshold thereby removing a false finger skeleton line and resulting in a second skeleton representation.

21. The method of claim 20, further comprising:

determining one or more hand attributes from the second skeleton representation, including at least a number of fingers; and comparing determined hand attributes with stored hand attribute profiles to recognize a hand sign.

22. The method of claim 21, wherein the hand attribute profiles include a palm object describing attributes including area, number of fingers, and location with respect to a target's torso.

23. The method of claim 21, wherein determining one or more hand attributes from the second skeleton representation further includes determining an orientation of a skeleton line in the second skeleton representation.

* * * * *

UNITED STATES PATENT AND TRADEMARK OFFICE
CERTIFICATE OF CORRECTION

PATENT NO. : 7,308,112 B2 Page 1 of 1
APPLICATION NO. : 11/129164
DATED : December 11, 2007
INVENTOR(S) : Kikuo Fujimura et al.

It is certified that error appears in the above-identified patent and that said Letters Patent is hereby corrected as shown below:

Column 22, line 65, please delete "ore" and insert --or--.

Column 23, line 12, please delete "a derive".

Column 23, line 55, please delete "ore" and insert --or--.

Column 25, line 24, please delete "ore" and insert --or--.

Column 26, line 3, please delete "ore" and insert --or--.

Signed and Sealed this

Twenty-ninth Day of April, 2008

JON W. DUDAS
*Director of the United States Patent and Trademark Office*